(12) United States Patent
Dopson et al.

(10) Patent No.: US 11,013,229 B2
(45) Date of Patent: May 25, 2021

(54) METHODS AND FORMULATIONS FOR STORING ENTOMOPATHOGENIC NEMATODES

(71) Applicant: Green Advantage Technology Inc., Ajax (CA)

(72) Inventors: Ryan Dopson, Ajax (CA); Lorelei Hepburn, Bowmanville (CA)

(73) Assignee: Green Advantage Technology Inc., Ajax (CA)

( * ) Notice: Subject to any disclaimer, the term of this patent is extended or adjusted under 35 U.S.C. 154(b) by 121 days.

(21) Appl. No.: 15/571,590

(22) PCT Filed: Apr. 29, 2016

(86) PCT No.: PCT/CA2016/050496
§ 371 (c)(1),
(2) Date: Nov. 3, 2017

(87) PCT Pub. No.: WO2016/176764
PCT Pub. Date: Nov. 10, 2016

(65) Prior Publication Data
US 2018/0153156 A1 Jun. 7, 2018

Related U.S. Application Data

(60) Provisional application No. 62/156,430, filed on May 4, 2015.

(51) Int. Cl.
| | | |
|---|---|---|
| *A01N 1/02* | (2006.01) | |
| *A01N 63/00* | (2020.01) | |
| *A01N 25/22* | (2006.01) | |
| *A01N 25/26* | (2006.01) | |

(52) U.S. Cl.
CPC ........... *A01N 1/0231* (2013.01); *A01N 25/22* (2013.01); *A01N 25/26* (2013.01); *A01N 63/00* (2013.01); *A01N 2300/00* (2013.01)

(58) Field of Classification Search
CPC .................................................. A01N 1/0231
See application file for complete search history.

(56) References Cited

U.S. PATENT DOCUMENTS

| | | |
|---|---|---|
| 4,765,275 A | 8/1988 | Yukawa et al. |
| 5,042,427 A | 8/1991 | Bedding |
| 5,554,533 A | 9/1996 | Bedding et al. |
| 5,674,516 A | 10/1997 | Raulston et al. |
| 5,932,237 A | 8/1999 | Raulston et al. |
| 5,965,149 A | 10/1999 | Silver |
| 6,184,434 B1 | 2/2001 | Raulston et al. |
| 6,407,310 B1 | 6/2002 | Bedding et al. |
| 6,432,698 B1 | 8/2002 | Gaugler et al. |
| 6,528,484 B1 | 3/2003 | Ensign et al. |
| 6,637,366 B1 | 10/2003 | Bedding et al. |
| 6,841,380 B2 | 1/2005 | Bedding et al. |
| 6,861,063 B2 | 3/2005 | Grewal |
| 7,011,837 B2 | 3/2006 | Koppenhofer |
| 7,014,859 B1 | 3/2006 | Duncan et al. |
| 7,374,773 B1 | 5/2008 | Shapiro-Ilan et al. |
| 7,569,748 B2 | 8/2009 | Ensign et al. |
| 7,641,913 B2 | 1/2010 | Koppenhofer |
| 8,505,236 B1 | 8/2013 | Morales-Ramos et al. |
| 2001/0043939 A1 | 11/2001 | Tachibana et al. |
| 2002/0094325 A1 | 7/2002 | Grewal |
| 2003/0017577 A1 | 1/2003 | Bedding et al. |
| 2003/0113299 A1 | 6/2003 | Koppenhofer |
| 2003/0157062 A1 | 8/2003 | Mikami et al. |
| 2003/0207806 A1 | 11/2003 | Ensign et al. |
| 2004/0116290 A1 | 6/2004 | Pena |
| 2005/0048037 A1 | 3/2005 | Koppenhofer |
| 2005/0244387 A1 | 11/2005 | Grewal |
| 2007/0256350 A1 | 11/2007 | Cates |
| 2011/0197289 A1 | 8/2011 | Fayyaz et al. |
| 2014/0112899 A1 | 4/2014 | Jeschke et al. |
| 2014/0364309 A1 | 12/2014 | Hellwege et al. |
| 2014/0364458 A1 | 12/2014 | Fischer et al. |
| 2015/0011389 A1 | 1/2015 | Hellwege |

FOREIGN PATENT DOCUMENTS

| | | |
|---|---|---|
| EP | 0668718 A1 | 8/1995 |
| EP | 2389805 B1 | 2/2014 |
| RU | 2144289 C1 | 1/2000 |
| RU | 2210209 C2 | 8/2003 |
| RU | 2225107 C2 | 3/2004 |
| WO | 2000/18887 A1 | 4/2000 |
| WO | 2002/047481 A2 | 6/2002 |

OTHER PUBLICATIONS

Umamheswari et al. (2006, Natural Product Radiance, vol. 5(2), pp. 95-98) (Year: 2006).*
Yinzhe et al. (2013, ISRN Agronomy, Article ID 871396, pp. 1-7) (Year: 2013).*
Lotfipour et al. (2012, Adv. Pharma. Bull., vol. 2(1), pp. 71-78) (Year: 2012).*
Peters, Arne., Prospects for application of entomopathogenic nematodes to soil, Retrieved on Apr. 20, 2015.
Umamaheswari, R., "Survival and infectivity of entomopathogenic nematodes in alginate gel formulations against rice meal moth larva, Corcyra cephalonica Stainton", Natural Product Radiance, Apr. 2006, vol. 5(2), pp. 95-98.
Hussein, M.A. et al., "Formulation of two native entomopathogenic nematodes at room temperature", Journal of Biopesticides, 2012, vol. 5 (Supplementary), pp. 23-27.
Menzler-Hokkanen, I. and Hokkanen, H., "Developing entomopathogenic nematode delivery systems for biological control of oilseed rape pests", IOBC/WPRS bulletin, 2005, vol. 28(3), pp. 19-22.

* cited by examiner

*Primary Examiner* — Thaian N. Ton
*Assistant Examiner* — David A. Montanari
(74) *Attorney, Agent, or Firm* — Melanie Szweras; Bereskin & Parr LLP/S.E.N.C.R.L., s.r.l.

(57) ABSTRACT

Provided herein are methods and formulations for stable and prolonged storage of infective juveniles of entomopathogenic nematodes.

12 Claims, 6 Drawing Sheets

Super female in soil

Nematode in soil

Nematodes found in all bags of soil.

IJ Nematode found in soil sample #2

IJ Nematode found in soil sample #5

Nematode found in soil sample #1

METHODS AND FORMULATIONS FOR STORING ENTOMOPATHOGENIC NEMATODES

CROSS-REFERENCE TO RELATED APPLICATIONS

This application is a national phase entry of PCT/CA2016/050496 filed Apr. 29, 2016 which designates the U.S.), which claims the benefit of priority to U.S. Provisional Application No. 62/156,430 filed May 4, 2015, the contents of which are incorporated herein by reference in their entirety.

FIELD

The present disclosure pertains to methods and formulations for prolonged storage of infective juveniles of entomopathogenic nematodes.

BACKGROUND

Entomopathogenic nematodes have valuable potential as bioinsecticides. Species in the Heterorhabditidae and Steinernematidae families have been effectively used as biological insecticides in pest management programs (Grewal et al. 2005). Methods of storing nematodes have been reported, for example in U.S. Pat. No. 4,765,275, which discloses storing nematodes under anaerobic conditions and at low temperature. Storing nematodes in clay (U.S. Pat. No. 5,042,427), in polyacrylamide gel (WO 1994005150) and in an encapsulating hydrogel agent (U.S. Pat. No. 4,615,833) have also been reported. Umamaheswari et al. 2006 have reported storing nematodes in alginate formulations to treat against rice meal moth larva.

SUMMARY

It is herein disclosed methods and formulations for stable and prolonged storage of infective juveniles of entomopathogenic nematodes, and in particular cruiser-type infective juveniles of entomopathogenic nematodes.

Accordingly, a first aspect includes a method of preparing a nematode formulation suitable for prolonged storage comprising mixing infective juveniles of entomopathogenic nematodes with water, a water-absorbing polymer and a cellulose compound to form a nematode formulation, wherein the infective juveniles of entomopathogenic nematodes are in suspension in the final formulation such that they have limited movement.

In an embodiment there is provided a method of preparing a nematode formulation suitable for prolonged storage, the steps comprising:
 a. mixing infective juveniles of entomopathogenic nematodes with water and a water-absorbing polymer to form a nematode gel;
 b. hardening the nematode gel by mixing said nematode gel with a cellulose compound to form a nematode formulation; and
 c. optionally dividing the nematode formulation into smaller pieces suitable for packaging, wherein the infective juveniles of entomopathogenic nematodes are in suspension in the final formulation such that said nematodes have limited movement.

In another embodiment there is provided a method of preparing a nematode formulation suitable for prolonged storage, the steps comprising:

a. mixing infective juveniles of entomopathogenic nematodes with water and a cellulose compound to form a nematode gel;
 b. thickening and/or hardening the nematode gel by mixing said nematode gel with a water-absorbing polymer to form a nematode formulation; and
 c. optionally dividing the nematode formulation into smaller pieces suitable for packaging, wherein the infective juveniles of entomopathogenic nematodes are in suspension in the final formulation such that said nematodes have limited movement.

In an embodiment, the infective juveniles of entomopathogenic nematodes belong to a *Steinernema* species or a *Heterorhabditis* species.

In another embodiment, the infective juveniles of entomopathogenic nematodes are cruiser-type infective juveniles of entomopathogenic nematodes.

In an embodiment, the formulation comprises about 10% w/v to about 20% w/v of infective juveniles of entomopathogenic nematodes, about 75% w/v to about 83% w/v water, about 2.0% w/v to about 3.0% w/v of a water-absorbing polymer and about 1.0% w/v to about 2.0% w/v of a cellulose compound.

In an embodiment, the formulation comprises about 10.0% w/v, about 10.5% w/v, about 11.0% w/v, about 11.5% w/v, about 12.0% w/v, about 12.5% w/v, about 13.0% w/v, about 13.5% w/v, about 14.0% w/v, about 14.5% w/v, about 15.0% w/v, about 15.5% w/v, about 16.0% w/v, about 16.5% w/v, about 17.0% w/v, about 17.5% w/v, about 18.0% w/v, about 18.5% w/v, about 19.0% w/v, about 19.5% w/v, or about 20.0% w/v infective juveniles of entomopathogenic nematodes.

In an embodiment, the formulation comprises about 83.0% w/v, about 83.5% w/v, about 84.0% w/v, about 84.5% w/v, about 85.0% w/v, about 85.5% w/v, about 86.0% w/v, about 86.5% w/v or about 87.0% w/v water.

In an embodiment, the formulation comprises about 1.0% w/v, about 1.1% w/v, about 1.2% w/v, about 1.3% w/v, about 1.4% w/v, about 1.5% w/v, about 1.6% w/v, about 1.7% w/v, about 1.8% w/v, about 1.9% w/v, about 2.0% w/v, about 2.1% w/v, about 2.2% w/v, about 2.3% w/v, about 2.4% w/v, about 2.5% w/v, about 2.6% w/v, about 2.7% w/v, about 2.8% w/v, about 2.9% w/v, about 3.0% w/v, about 3.1% w/v, about 3.2% w/v, about 3.3% w/v, about 3.4% w/v, about 3.5% w/v, about 3.6% w/v, about 3.7% w/v, about 3.8% w/v, about 3.9% w/v, about 4.0% w/v, about 4.1% w/v, about 4.2% w/v, about 4.3% w/v, about 4.4% w/v, about 4.5% w/v, about 4.6% w/v, about 4.7% w/v, about 4.8% w/v, about 4.9% w/v or about 5.0% w/v of the water-absorbing polymer.

In an embodiment, the formulation comprises about 0.5% w/v, about 0.6% w/v, about 0.7% w/v, about 0.8% w/v, about 0.9% w/v, about 1.0% w/v, about 1.1% w/v, about 1.2% w/v, about 1.3% w/v, about 1.4% w/v, about 1.5% w/v, about 1.6% w/v, about 1.7% w/v, about 1.8% w/v, about 1.9% w/v, about 2.0% w/v, about 2.1% w/v, about 2.2% w/v, about 2.3% w/v, about 2.4% w/v, about 2.5% w/v, about 2.6% w/v, about 2.7% w/v, about 2.8% w/v, about 2.9% w/v or about 3.0% w/v of the cellulose compound.

In an embodiment, the water is deionized water. In another embodiment, the water is sterilized water.

In an embodiment, the water-absorbing polymer is sodium polyacrylate, sodium polyacrylamide or polyethylene glycol hydrogel.

In an embodiment, the water-absorbing polymer is sodium polyacrylate.

In an embodiment, the cellulose compound is carboxymethyl cellulose, ethyl methyl cellulose, hydroxypropyl cellulose or methylcellulose.

In an embodiment, the cellulose is carboxymethyl cellulose.

In a further embodiment, the nematode formulation comprises infective juveniles of entomopathogenic nematodes, water, sodium polyacrylate and carboxymethyl cellulose.

In yet another embodiment, the formulation comprises about 10.0% w/v to about 20.0% w/v infective juveniles of entomopathogenic nematodes, about 2.0% w/v to about 3.0% w/v sodium polyacrylate, about 1.0% w/v to about 2.0% w/v carboxymethyl cellulose, and about 75.0% w/v to about 87.0% w/v water.

In an embodiment, the formulation comprises about 1.0% w/v, about 1.1% w/v, about 1.2% w/v, about 1.3% w/v, about 1.4% w/v, about 1.5% w/v, about 1.6% w/v, about 1.7% w/v, about 1.8% w/v, about 1.9% w/v, about 2.0% w/v, about 2.1% w/v, about 2.2% w/v, about 2.3% w/v, about 2.4% w/v, about 2.5% w/v, about 2.6% w/v, about 2.7% w/v, about 2.8% w/v, about 2.9% w/v, about 3.0% w/v, about 3.1% w/v, about 3.2% w/v, about 3.3% w/v, about 3.4% w/v, about 3.5% w/v, about 3.6% w/v, about 3.7% w/v, about 3.8% w/v, about 3.9% w/v, about 4.0% w/v, about 4.1% w/v, about 4.2% w/v, about 4.3% w/v, about 4.4% w/v, about 4.5% w/v, about 4.6% w/v, about 4.7% w/v, about 4.8% w/v, about 4.9% w/v or about 5.0% sodium polyacrylate.

In another embodiment, the formulation comprises about 2.5% w/v sodium polyacrylate.

In an embodiment, the formulation comprises about 0.5% w/v, about 0.6% w/v, about 0.7% w/v, about 0.8% w/v, about 0.9% w/v, about 1.0% w/v, about 1.1% w/v, about 1.2% w/v, about 1.3% w/v, about 1.4% w/v, about 1.5% w/v, about 1.6% w/v, about 1.7% w/v, about 1.8% w/v, about 1.9% w/v, about 2.0% w/v, about 2.1% w/v, about 2.2% w/v, about 2.3% w/v, about 2.4% w/v, about 2.5% w/v, about 2.6% w/v, about 2.7% w/v, about 2.8% w/v, about 2.9% w/v or about 3.0% w/v carboxymethyl cellulose.

In another embodiment, the formulation comprises about 1.5% w/v carboxymethyl cellulose.

In a further embodiment, the nematode formulation comprises about 16.0% w/v nematodes, about 2.5% w/v sodium polyacrylate, about 1.5% w/v carboxymethyl cellulose and about 80.0% w/v water.

In an embodiment, the formulation is stored at a temperature ranging from about 1° C. to about 30° C. In another embodiment, the formulation is stored at a temperature ranging from about 12° C. to about 30° C., about 13° C. to about 29° C., about 14° C. to about 28° C., about 15° C. to about 27° C., about 16° C. to about 26° C., about 17° C. to about 25° C., about 18° C. to about 24° C., about 19° C. to about 23° C. or about 20° C. to about 22° C.

In an embodiment, the formulation is stored at a temperature ranging from about 20° C. to about 22° C.

In an embodiment, the method comprises storing the formulation for a period of about one to about six months, optionally about three to about six months.

In further embodiment, the nematodes stored in the formulation herein disclosed retain infectivity for a period of about one to about six months, optionally about three to about six months.

In an embodiment, the nematode comprised in the formulation comprises insecticidal properties sufficient to induce death and/or damage to host insects such that additional insecticidal agent is not required.

In an embodiment, the method further comprises storing the formulation under aerobic conditions.

In a further embodiment, the method further comprises continuously stirring the infective juveniles of entomopathogenic nematodes with water and the water-absorbing polymer and/or the cellulose compound until formation of the nematode gel to ensure suspension of the infective juveniles of entomopathogenic nematodes.

Another aspect is a method of preparing a nematode formulation suitable for prolonged storage, the steps comprising:
a. mixing infective juveniles of entomopathogenic nematodes with an alginate solution to form an alginate gel;
b. encapsulating the alginate gel by contacting said alginate gel with a complexing solution;
c. removing the alginate capsules from the complexing solution;
d. rinsing the alginate capsules in water to remove remaining complexing solution;
e. coating the alginate capsules with a cellulose compound; and
f. drying the alginate capsules,
wherein the infective juveniles of entomopathogenic nematodes are in suspension in the final formulation such that said nematodes have limited movement.

In an embodiment, the infective juveniles of entomopathogenic nematodes belong to a *Steinernema* species or a *Heterorhabditis* species.

In another embodiment, the infective juveniles of entomopathogenic nematodes are cruiser-type infective juveniles of entomopathogenic nematodes.

In an embodiment, the alginate solution comprises an alginate compound and water.

In another embodiment, the alginate solution comprises about 1.0% w/v to about 5.0% w/v of an alginate compound, optionally about 3.0% w/v of an alginate compound.

In an embodiment, the alginate compound is sodium alginate.

In another embodiment, the alginate solution comprises about 1.0% w/v to about 5.0% w/v sodium alginate, optionally about 3.0% w/v sodium alginate.

In one embodiment, the alginate solution comprises about 3.0% w/v sodium alginate and about 97.0% w/v water. In one embodiment, the alginate solution comprises about 6.0% w/v sodium alginate and about 94.0% w/v water.

In one embodiment, the alginate solution is mixed with infective juveniles of entomopathogenic nematodes to form an alginate gel.

In one embodiment, the alginate gel comprises about 10.0% w/v to about 20.0% w/v infective juveniles of entomopathogenic nematodes. In another embodiment, the alginate gel comprises about 2.0% w/v to about 20.0% w/v infective juveniles of entomopathogenic nematodes.

In an embodiment, the alginate gel comprise about 2% w/v, about 3% w/v, about 5% w/v, about 10.0% w/v, about 10.5% w/v, about 11.0% w/v, about 11.5% w/v, about 12.0% w/v, about 12.5% w/v, about 13.0% w/v, about 13.5% w/v, about 14.0% w/v, about 14.5% w/v, about 15.0% w/v, about 15.5% w/v, about 16.0% w/v, about 16.5% w/v, about 17.0% w/v, about 17.5% w/v, about 18.0% w/v, about 18.5% w/v, about 19.0% w/v, about 19.5% w/v, or about 20.0% w/v infective juveniles of entomopathogenic nematodes.

In one embodiment, the alginate gel comprises about 16.0% w/v infective juveniles of entomopathogenic nematodes. In another embodiment, the alginate gel comprises about 3.0% w/v infective juveniles of entomopathogenic nematodes.

In another embodiment, the alginate gel comprises about 16.0% w/v infective juveniles of entomopathogenic nematodes, about 3.0% w/v of an alginate compound and about 81.0% w/v water. In another embodiment, the alginate gel comprises about 3.0% w/v infective juveniles of entomopathogenic nematodes, about 4.0% w/v of an alginate compound and about 93.0% w/v water.

In an embodiment, a complexing solution comprises a complexing agent and water.

In an embodiment, the complexing solution comprises about 0.3% w/v, about 0.4% w/v, about 0.5% w/v, about 0.6% w/v, about 0.7% w/v, about 0.8% w/v, about 0.9% w/v, about 1.0% w/v, about 1.1% w/v, about 1.2% w/v, about 1.3% w/v, about 1.4% w/v, about 1.5% w/v, about 1.6% w/v, about 1.7% w/v, about 1.8% w/v, about 1.9% w/v, about 2.0% w/v, about 2.1% w/v, about 2.2% w/v, about 2.3% w/v, about 2.4% w/v, about 2.5% w/v, about 2.6% w/v, about 2.7% w/v, about 2.8% w/v, about 2.9% w/v, about 3.0% w/v, about 3.1% w/v, about 3.2% w/v, about 3.3% w/v, about 3.4% w/v, about 3.5% w/v, about 3.6% w/v, about 3.7% w/v, about 3.8% w/v, about 3.9% w/v or about 4.0% w/v of the complexing agent.

In an embodiment, the complexing agent is calcium chloride.

In an embodiment, the complexing solution comprises about 0.3% w/v, about 0.4% w/v, about 0.5% w/v, about 0.6% w/v, about 0.7% w/v, about 0.8% w/v, about 0.9% w/v, about 1.0% w/v, about 1.1% w/v, about 1.2% w/v, about 1.3% w/v, about 1.4% w/v, about 1.5% w/v, about 1.6% w/v, about 1.7% w/v, about 1.8% w/v, about 1.9% w/v, about 2.0% w/v, about 2.1% w/v, about 2.2% w/v, about 2.3% w/v, about 2.4% w/v, about 2.5% w/v, about 2.6% w/v, about 2.7% w/v, about 2.8% w/v, about 2.9% w/v, about 3.0% w/v, about 3.1% w/v, about 3.2% w/v, about 3.3% w/v, about 3.4% w/v, about 3.5% w/v, about 3.6% w/v, about 3.7% w/v, about 3.8% w/v, about 3.9% w/v or about 4.0% w/v calcium chloride.

In another embodiment, the complexing solution comprises about 0.5% w/v to about 1.5% w/v calcium chloride. In one embodiment, the complexing solution comprises about 0.8% w/v calcium chloride.

In an embodiment, the alginate capsules obtained in step b) remain in the complexing solution for about 30 minutes.

In another embodiment, the alginate capsules remain in the complexing solution for about 40 minutes, about 50 minutes, about 60 minutes, about 90 minutes, about 120 minutes, about 150 minutes, about 2 hours, about 3 hours, about 5 hours or about 10 hours.

In another embodiment, the alginate capsules comprise about 2% w/v, about 3% w/v, about 5% w/v, about 10.0% w/v, about 10.5% w/v, about 11.0% w/v, about 11.5% w/v, about 12.0% w/v, about 12.5% w/v, about 13.0% w/v, about 13.5% w/v, about 14.0% w/v, about 14.5% w/v, about 15.0% w/v, about 15.5% w/v, about 16.0% w/v, about 16.5% w/v, about 17.0% w/v, about 17.5% w/v, about 18.0% w/v, about 18.5% w/v, about 19.0% w/v, about 19.5% w/v, or about 20.0% w/v infective juveniles of entomopathogenic nematodes.

In one embodiment, the alginate capsules comprise about 16.0% w/v infective juveniles of entomopathogenic nematodes. In another embodiment, the alginate gel comprises about 3.0% w/v infective juveniles of entomopathogenic nematodes.

In one embodiment, the alginate capsules comprise about 2.0% w/v to about 20.0% w/v nematodes, about 1.0% w/v to about 5.0% w/v calcium alginate and about 75.0% w/v to about 97% w/v water.

In another embodiment, the alginate capsules comprise about 16.0% w/v infective juveniles of entomopathogenic nematodes, about 3.0% w/v calcium alginate and about 81.0% w/v water. In another embodiment, the alginate capsules comprise about 3.0% w/v infective juveniles of entomopathogenic nematodes, about 4.0% w/v of an alginate compound and about 93.0% w/v water.

In another embodiment, prior to coating the alginate capsules with a cellulose compound as described in step e), the alginate capsules are dried for at least 3 hours.

In an embodiment, the cellulose compound is cellulose acetate, carboxymethyl cellulose, ethyl methyl cellulose, hydroxypropyl cellulose, methylcellulose.

In one embodiment, the cellulose is cellulose acetate.

In yet a further embodiment, the alginate capsules obtained in step e) are dried for about 1 to about 5 days.

The alginate capsules obtained in step e) can be dried at a temperature ranging from about 1° C. to about 30° C.

In one embodiment, the alginate capsules are dried at room temperature, optionally at a temperature ranging from about 20° C. to about 25° C.

In an embodiment, the alginate formulation comprises about 10.0% w/v to about 30.0% w/v infective juveniles of entomopathogenic nematodes.

In an embodiment, the final formulation comprises a water content less than about 80.0% w/v or less than about 70.0% w/v.

In another embodiment, the method further comprises storing the formulation for about one to about twelve months, optionally for six to ten months.

In further embodiment, the nematodes stored in the formulation herein disclosed retain infectivity for a period of about one month to about twelve months, optionally for about six months to about ten months.

In yet another embodiment, the nematodes stored in the formulation herein disclosed retain infectivity for least a one month period, at least a two month period, at least a three month period, at least a four month period, at least a five month period or at least a six month period, at least a seven month period, at least a eight month period, at least a nine month period, at least a ten month period, at least an eleven month period or at least a twelve month period.

In an embodiment, the method further comprises storing the formulation under aerobic conditions.

In an embodiment, the infective juveniles of entomopathogenic nematode comprised in the alginate formulation comprise insecticidal properties sufficient to induce death and/or damage to host insects such that additional insecticidal agent is not required.

In another embodiment, the method further comprises continuously stirring the infective juveniles of entomopathogenic nematodes with the alginate solution until formation of the alginate gel to ensure suspension of the infective juveniles of entomopathogenic nematodes.

In an embodiment, the alginate formulation comprises a water content less than 94% w/v, less than 93% w/v, less than 90% w/v, less than 85% w/v, 80% w/v, less than 79% w/v, less than 78% w/v, less than 77% w/v less than 76% w/v, less than 75% w/v, less than 74% w/v, less than 73% w/v, less than 72% w/v, less than 71% w/v, less than 70% w/v, less than 69% w/v, less than 68% w/v, less than 67% w/v, less than 66% w/v or less than 65% w/v.

A further aspect is a nematode formulation obtained according to the methods herein disclosed.

Yet another aspect includes a method of biologically controlling pests comprising diluting in water a nematode formulation obtained according to the methods herein disclosed and applying a resulting composition to an area subject to pest infestation.

A further aspect includes a method of biologically controlling pests comprising applying to an area subject to pest infestation a nematode formulation obtained according to the methods herein disclosed wherein the nematode formulation degrades with time and in the presence of water and ambient humidity.

In an embodiment, the nematode formulation comprising alginate capsules is applied directly to the affected area. The alginate capsules slowly degrade with time and in the presence of water and ambient humidity.

Another aspect is a method of storing and transporting nematodes comprising:
a. obtaining a nematode formulation according to the methods herein disclosed;
b. optionally contacting the nematode formulation with a carrier; and
c. packaging the nematode formulation in a container suitable for storage and transport, optionally a nematode permeable pouch, optionally using a form fill sealing machine,
wherein the carrier is selected from any one of vermiculite, clay, sand, dirt, peat, diatomaceous earth and coconut coir.

In one embodiment, the cellulose-based formulation obtained according to the methods herein described is packaged, using a form fill sealing machine, in a nematode permeable pouch, for example a tea bag. The cellulose-based nematode formulation packaged in a nematode permeable pouch can then be stored for several months at room temperature, under aerobic conditions. In order to use the nematode formulation, the nematode permeable pouch is placed in a receptacle containing water and the formulation is dissolved in said water. The nematode permeable pouch comprises pores of a sufficient size to allow the nematodes to exit the pouch. The water-nematode mixture is then ready to be applied to an area subject to pest infestation.

A further aspect is a cellulose-based formulation comprising about 10% w/v to about 20% w/v of infective juveniles of entomopathogenic nematodes as disclosed herein, about 75% w/v to about 87% w/v water as disclosed herein, about 2.0% w/v to about 3.0% w/v of a water-absorbing polymer as disclosed herein and about 1.0% w/v to about 2.0% w/v of a cellulose compound as disclosed herein, and wherein the infective juveniles of entomopathogenic nematodes are in suspension such that said nematodes have limited movement.

In one embodiment, the water-absorbing polymer is sodium polyacrylate.

In another embodiment, the cellulose compound is carboxymethyl cellulose.

In one embodiment, the infective juveniles of entomopathogenic nematodes are cruiser-type infective juveniles of entomopathogenic nematodes.

In yet another embodiment, the cellulose-based formulation comprises about 10.0% w/v to about 20.0% w/v of infective juveniles of entomopathogenic nematodes, about 75% w/v to about 87% w/v water, about 2.0% w/v to about 3.0% w/v of a sodium polyacrylate and about 1.0% w/v to about 2.0% w/v of carboxymethyl cellulose.

In a further embodiment, the cellulose-based formulation comprises about 16.0% w/v nematodes, about 2.5% w/v sodium polyacrylate, about 1.5% w/v carboxymethyl cellulose and about 80.0% w/v water.

In an embodiment, the cellulosed-based formulation is stored for a period of about one to about six months, optionally about three to about six months.

In further embodiment, the nematodes stored in the cellulosed-based formulation herein disclosed retain infectivity for a period of about one to about six months, optionally about three to about six months.

In an embodiment, the cellulose-based formulation is stored at a temperature ranging from about 1° C. to about 30° C.

In another embodiment, the formulation is stored at a temperature ranging from about 12° C. to about 30° C., about 13° C. to about 29° C., about 14° C. to about 28° C., about 15° C. to about 27° C., about 16° C. to about 26° C., about 17° C. to about 25° C., about 18° C. to about 24° C., about 19° C. to about 23° C. or about 20° C. to about 22° C.

In an embodiment, the nematode comprised in the cellulosed-based formulation comprises insecticidal properties sufficient to induce death and/or damage to host insects such that additional insecticidal agent is not required.

Another aspect is an alginate formulation comprising about 2.0% w/v to about 30.0% w/v infective juveniles of entomopathogenic nematodes as disclosed herein, wherein the alginate formulation is further coated with a cellulose compound disclosed herein, and wherein the infective juveniles of entomopathogenic nematodes are in suspension such that said nematodes have limited movement.

In one embodiment, the infective juveniles of entomopathogenic nematodes are cruiser-type infective juveniles of entomopathogenic nematodes.

In another embodiment, the cellulose compound is cellulose acetate.

In one embodiment, the alginate formulation comprises about 1.0% w/v to about 10.0% w/v calcium alginate, optionally about 2.0% w/v to about 8.0% w/v calcium alginate or optionally about 3.0% w/v to about 6.0% w/v calcium alginate.

In an embodiment, the alginate formulation comprises a water content less than 94% w/v, less than 93% w/v, less than 90% w/v, less than 85% w/v, less than 80% w/v, less than 79% w/v, less than 78% w/v, less than 77% w/v less than 76% w/v, less than 75% w/v, less than 74% w/v, less than 73% w/v, less than 72% w/v, less than 71% w/v, less than 70% w/v, less than 69% w/v, less than 68% w/v, less than 67% w/v, less than 66% w/v or less than 65% w/v.

In an embodiment, the alginate formulation is stored for a period of about one to about twelve months, optionally six to about ten months.

In further embodiment, the nematodes stored in the alginate formulation herein disclosed retain infectivity for a period of about one to about twelve months, optionally six to about ten months.

In one embodiment, the formulation is stored at a temperature ranging from about −10° C. to about 30° C.

In an embodiment, the nematode comprised in the alginate formulation comprises insecticidal properties sufficient to induce death and/or damage to host insects such that additional insecticidal agent is not required.

Other features and advantages of the present disclosure will become apparent from the following detailed description. It should be understood, however, that the detailed description and the specific examples while indicating preferred embodiments of the disclosure are given by way of illustration only, since various changes and modifications within the spirit and scope of the disclosure will become apparent to those skilled in the art from this detailed description.

BRIEF DESCRIPTION OF THE DRAWINGS

Embodiments of the present disclosure will now be described in relation to the drawings in which:

FIG. 1 is a graph showing survivability of an embodiment, *Steinernema feltiae* nematodes stored in alginate balls.

FIG. 2A shows a bag of Hillsview Potting Soil Premier Tech Horticulture. FIG. 2B shows 300 g Potting Soil Samples from the Hillsview Potting Soil bag. FIG. 2C shows soil sample preparation with *Galleria* in potting soil for infection with over wintered Alginate granules. FIG. 2D shows 3 Day old samples of infected *Galleria* Soil sample bags with over wintered Alginate granules.

Figure 5A:
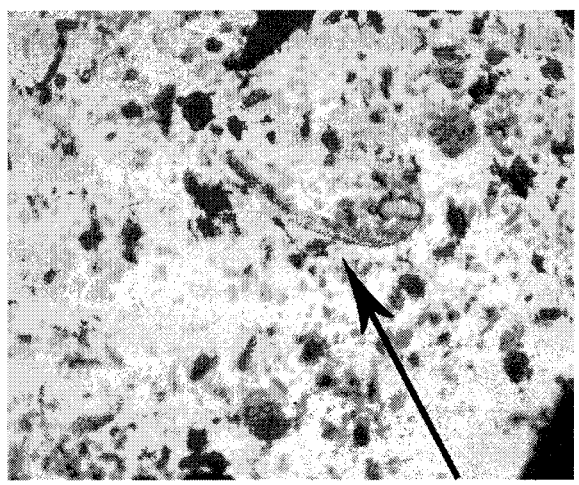
Figure 5B:
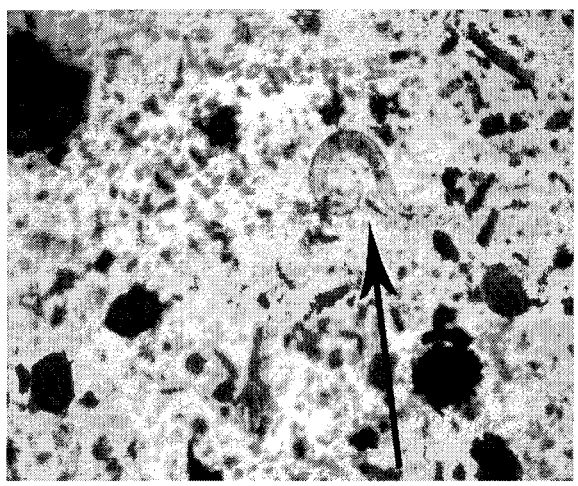
Figure 5C:
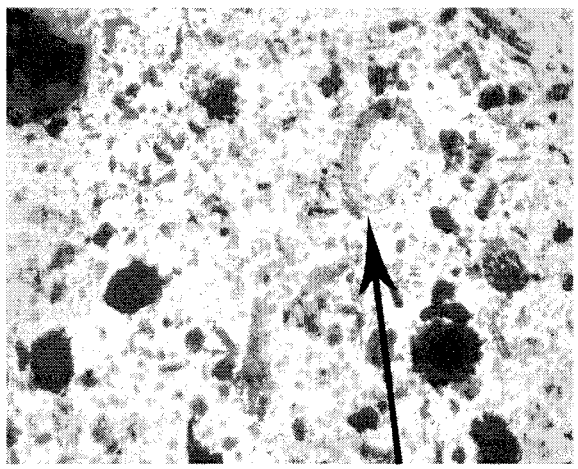
Figure 5D:
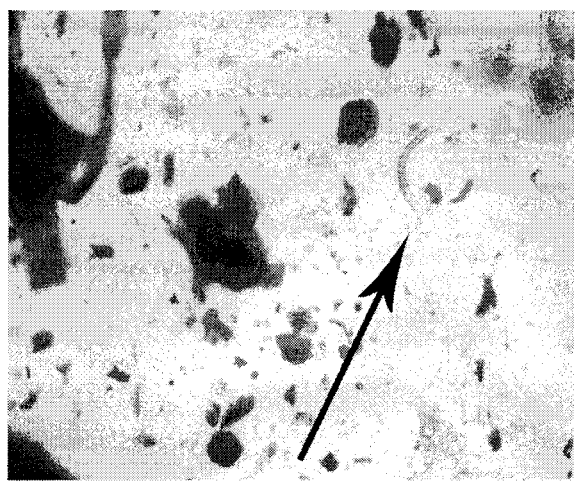
Figure 5E:
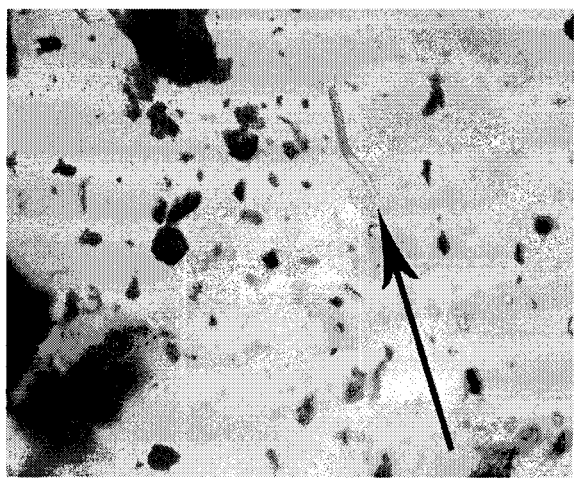
Figure 5F:
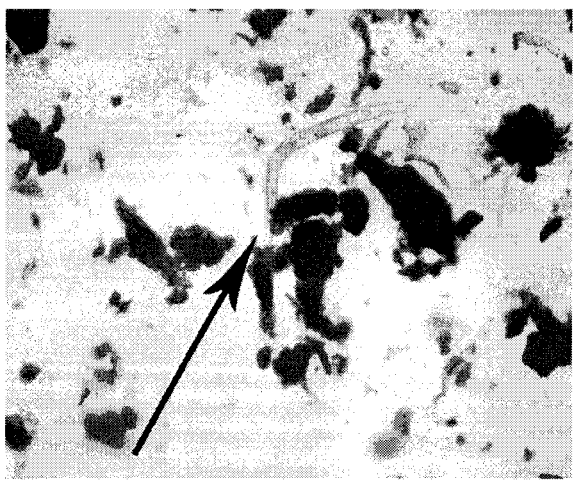

FIG. 5a shows microscopic view of Super female nematode extracted from over-wintered Soil sample #2—showing nematode reproduction occurred. FIG. 5b shows microscopic view of *Steinernema feltiae* nematode isolated from Soil Sample #4. FIG. 5c shows microscopic view of *Steinernema feltiae* nematode isolated from Soil Sample #2 (nematode samples isolated from all 10 soil samples). FIG. 5d shows microscopic view of infective juvenile *Steinernema feltiae* isolated from Soil Sample #2. FIG. 5e shows microscopic view of infective juvenile *Steinernema feltiae* isolated from Soil Sample #5. FIG. 5f shows microscopic view of *Steinernema feltiae* nematode isolated from Soil Sample #1.

DETAILED DESCRIPTION OF THE DISCLOSURE

I. Definitions

The term "cruiser-type nematode" as used herein refers to nematodes that are larger and more mobile than other types of nematodes such as ambush-type nematodes. Examples of cruiser-type nematode strains are *Steinernema glaseri* and *Heterorhabditis bacteriophora*. Cruiser-type nematodes are highly active and can move significant distances using volatile cues and other methods to find their host underground (Grewal et al., 1994). Cruiser-type nematodes typically attack less mobile hosts for example white grubs (scarabs).

The term "ambush-type nematode" as used herein refers to nematodes that are smaller and less mobile than cruiser-type nematodes, for example *Steinernema carpocapsae*. Ambush-type nematodes typically have an energy-conserving approach and wait to attack mobile insects.

As used herein, "limited movement" refers to nematodes comprised in a formulation wherein the formulation prevents the nematodes from moving or reduces the nematodes' capability to move, for example due to a high formulation density, such that the nematodes remain in suspension and are unable to crawl out of the formulation. The nematodes in the presently claimed formulations, for example an alginate formulation or a cellulose-based formulation, have limited movement or decreased movement compared to nematodes stored in a less dense formulation, for example, in water. Limiting the movement of the nematodes also preserves the energy of the nematodes and increases survival duration of the nematodes.

The term "alginate formulation" as used herein refers to a formulation comprising infective juveniles of entomopathogenic nematodes and a water-insoluble alginate solution, for example calcium alginate or sodium alginate. The alginate formulation is formed by contacting the infective juveniles of entomopathogenic nematodes with an aqueous alginate solution, optionally comprising sodium alginate, with an aqueous complexing solution, optionally comprising calcium chloride. Upon contact of the nematode-alginate mixture with the complexing agent, calcium alginate capsules are formed. In one embodiment, the alginate capsules are coated with a cellulose compound and then further dried.

The term "cellulose-based formulation" as used herein refers to a formulation comprising infective juveniles of entomopathogenic nematodes, water, a water-absorbing polymer and a cellulose compound. In one embodiment, the nematodes, water-absorbing polymer and water are first mixed together until formation of a nematode gel, and then mixed with a cellulose compound to harden the nematode gel until formation of a cellulose-based formulation. In another embodiment, the nematode, cellulose compound and water are first mixed until formation of a nematode gel, and then mixed with a water-absorbing polymer to harden the nematode gel until formation of a cellulose-based formulation.

As used herein, "storing under aerobic conditions" means storing the nematodes in an environment comprising the presence of free oxygen. For example, the nematode formulation can be stored in a receptacle wherein air can freely circulate. For example, the nematode formulations herein disclosed do not need to be stored in an airtight container or under substantially anaerobic conditions.

The term "carrier" as used here relates to an inert substance that is mixed into the nematode formulation to facilitate packaging and to provide the nematode formulation an earthy texture. Examples of carriers include vermiculite, clay, sand, dirt, peat and coir. In one embodiment, the carrier is vermiculite.

The term "infectivity" or "insecticidal infectivity" as used herein relates to the ability of a nematode to enter the body of a host insect and harm and/or cause the death of the host insect.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies. More specifically, the term "about" means plus or minus 10% of the number to which reference is being made.

In understanding the scope of the present disclosure, the term "consisting" and its derivatives, as used herein, are intended to be close ended terms that specify the presence of stated features, elements, components, groups, integers, and/or steps, and also exclude the presence of other unstated features, elements, components, groups, integers and/or steps.

The recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about." Further, it is to be understood that "a," "an," and "the" include plural referents unless the content clearly dictates otherwise.

Further, the definitions and embodiments described in particular sections are intended to be applicable to other embodiments herein described for which they are suitable as would be understood by a person skilled in the art. For example, in the following passages, different aspects are defined in more detail. Each aspect so defined may be combined with any other aspect or aspects unless clearly indicated to the contrary.

II. Methods and Formulations

Disclosed herein are methods and formulations suitable for long term storage of infective juveniles of entomopathogenic nematodes. Also herein disclosed are nematode formulations that can be stored at room temperature for prolonged duration and that do not require addition of insecticidal agent or antimicrobial agent.

Accordingly, a first aspect includes a method of preparing a nematode formulation suitable for prolonged storage comprising mixing infective juveniles of entomopathogenic nematodes with water, a water-absorbing polymer and a cellulose compound to form a nematode formulation, wherein the infective juveniles of entomopathogenic nematodes are in suspension in the final formulation such that they have limited movement.

In an embodiment there is provided a method of preparing a nematode formulation suitable for prolonged storage, the steps comprising:
  a. mixing infective juveniles of entomopathogenic nematodes with water and a water-absorbing polymer to form a nematode gel;
  b. hardening the nematode gel by mixing said nematode gel with a cellulose compound to form a nematode formulation; and
  c. optionally dividing the nematode formulation into smaller pieces suitable for packaging,
wherein the infective juveniles of entomopathogenic nematodes are in suspension in the final formulation such that said nematodes have limited movement.

In another embodiment there is provided a method of preparing a nematode formulation suitable for prolonged storage, the steps comprising:
  a. mixing infective juveniles of entomopathogenic nematodes with water and a cellulose compound to form a nematode gel;
  b. thickening and/or hardening the nematode gel by mixing said nematode gel with a water-absorbing polymer to form a nematode formulation; and
  c. optionally dividing the nematode formulation into smaller pieces suitable for packaging,
wherein the infective juveniles of entomopathogenic nematodes are in suspension in the final formulation such that said nematodes have limited movement.

The present disclosure relates to nematodes having insecticidal properties, including, but not limited to nematodes belonging to the *Steinernema* species or a *Heterorhabditis* species.

In an embodiment, the infective juveniles of entomopathogenic nematodes belong to a *Steinernema* species or a *Heterorhabditis* species.

In another embodiment, the nematodes belong to the following nematode strains: *Steinernema feltiae, Steinernema glaseri, Steinernema kraussei, Steinernema carpocapsae, Steinernema scapterisci, Steinernema riobrave, Heterorhabditis bacteriophora, Heterorhabditis megidis, Heterorhabditis indica Heterorhabditis marelatus* and/or *Phasmarhabditis hermaphrodita*.

In another embodiment, the infective juveniles of entomopathogenic nematodes are cruiser-type infective juveniles of entomopathogenic nematodes. Examples of cruiser-type infective juveniles of entomopathogenic nematodes include, without limitation, *Steinernema glaseri* and *Heterorhabditis bacteriophora*.

Cruiser-type nematodes are larger, stronger and more mobile than smaller or ambush-type nematodes, for example *Steinernema carpocapsae* nematodes, and must be stored in a formulation comprising a sufficient density to prevent the cruiser-type nematodes from crawling out of the formulation and/or excessively moving therefore causing depletion of energy reserves.

Entomopathogenic nematodes herein disclosed can be obtained commercially in a dry form or can be produced according to methods known in the art. For example, nematodes can be produced in vivo by infecting insect hosts, for example *Galleria mellonella* larvae, with infective juveniles of entomopathogenic nematodes then collecting the reared nematodes, for example by suspending the insect carcass in water and obtaining an aqueous solution of nematodes. Nematodes can also be produced using a White trap (White G F, 1927). Other known methods include in vitro production using solid culture. For example, small pieces of foam are placed into a sterilized bag then mixed with a thick media. Symbiotic bacteria is added to the bag and allowed to grow for several days, and then infective juveniles of entomopathogenic nematodes are introduced. The solid culture technique is affordable but may be prone to bacterial contamination. Nematodes can also be produced using fermentation techniques. For example, a stock of symbiotic bacteria is placed in a bioreactor under sterile conditions and a culture growth is grown. Infective juveniles of entomopathogenic nematodes are introduced to the culture growth. Depending on the nematode species, it can take from about 13-22 days for the nematodes to reach their peak production. After 22 days the nematodes will begin to die due to lack of oxygen and increasing amount of organic matter. Another method of nematode production is the fermented process wherein a liquid media is cultured with the nematodes symbiotic bacteria in flasks. For example, after about 3 days have passed to allow bacteria growth, the nematodes are added to the liquid media. To mimic a bioreactor, the flasks are shaken on a bench top shaker at about 130 rpm. The top of the flask is sealed with foam and a single layer of aluminum foil to allow air flow. After about 22 days, the nematode production reaches a peak. The process is then reproduced by making another flask by using half of the 22-day media and bacteria from the old flask and adding it to the new flask of bacteria and media. This process is repeated until the number of nematodes needed is reached.

The nematodes are suspended in a formulation comprising water, a water-absorbing polymer and a cellulose compound. The nematode formulation allows sufficient oxygen supply by gas diffusion and allows moisture retention to prevent desiccation of the nematodes.

In an embodiment, the formulation comprises about 10.0% w/v, about 10.5% w/v, about 11.0% w/v, about 11.5% w/v, about 12.0% w/v, about 12.5% w/v, about 13.0% w/v, about 13.5% w/v, about 14.0% w/v, about 14.5% w/v, about 15.0% w/v, about 15.5% w/v, about 16.0% w/v, about 16.5% w/v, about 17.0% w/v, about 17.5% w/v, about 18.0% w/v, about 18.5% w/v, about 19.0% w/v, about 19.5% w/v, or about 20.0% w/v infective juveniles of entomopathogenic nematodes.

In an embodiment, the formulation comprises about 83.0% w/v, about 83.5% w/v, about 84.0% w/v, about 84.5% w/v, about 85.0% w/v, about 85.5% w/v, about 86.0% w/v, about 86.5% w/v or about 87.0% w/v water.

In an embodiment, the water is deionized water. In another embodiment, the water is sterilized water.

Polymers that retain large amounts of a liquid compared to their own weight can be used as a water-absorbing polymer, for example hydrogels, absorbent polymers and superabsorbent polymers. The person skilled in the art would understand that any water-absorbent polymer that is non-toxic for the nematodes can be used.

In an embodiment, the formulation comprises about 1.0% w/v, about 1.1% w/v, about 1.2% w/v, about 1.3% w/v, about 1.4% w/v, about 1.5% w/v, about 1.6% w/v, about 1.7% w/v, about 1.8% w/v, about 1.9% w/v, about 2.0% w/v, about 2.1% w/v, about 2.2% w/v, about 2.3% w/v, about 2.4% w/v, about 2.5% w/v, about 2.6% w/v, about 2.7% w/v, about 2.8% w/v, about 2.9% w/v, about 3.0% w/v, about 3.1% w/v, about 3.2% w/v, about 3.3% w/v, about 3.4% w/v, about 3.5% w/v, about 3.6% w/v, about 3.7% w/v, about 3.8% w/v, about 3.9% w/v, about 4.0% w/v, about 4.1% w/v, about 4.2% w/v, about 4.3% w/v, about 4.4% w/v, about 4.5% w/v, about 4.6% w/v, about 4.7% w/v, about 4.8% w/v, about 4.9% w/v or about 5.0% w/v of the water-absorbing polymer.

In an embodiment, the water-absorbing polymer is sodium polyacrylate, sodium polyacrylamide or polyethylene glycol hydrogel.

Sodium polyacrylate is a suitable polymer as it can absorb 300 times its own weight in water.

In an embodiment, the water-absorbing polymer is sodium polyacrylate.

Cellulose is a chemical compound that is water soluble and non-toxic for nematodes. In an embodiment, the cellulose compound is carboxymethyl cellulose, ethyl methyl cellulose, hydroxypropyl cellulose or methylcellulose. The person skilled in the art would understand that other known cellulose compounds presenting similar properties to the cellulose compounds herein described can be used.

In an embodiment, the cellulose is carboxymethyl cellulose.

In an embodiment, the formulation comprises about 10.0% w/v to about 20.0% w/v of infective juveniles of entomopathogenic nematodes, about 75.0% w/v to about 87% w/v water, about 2.0% w/v to about 3.0% w/v of a water-absorbing polymer and about 1.0% w/v to about 2.0% w/v of a cellulose compound.

In an embodiment, the formulation comprises about 1.0% w/v, about 1.1% w/v, about 1.2% w/v, about 1.3% w/v, about 1.4% w/v, about 1.5% w/v, about 1.6% w/v, about 1.7% w/v, about 1.8% w/v, about 1.9% w/v, about 2.0% w/v, about 2.1% w/v, about 2.2% w/v, about 2.3% w/v, about 2.4% w/v, about 2.5% w/v, about 2.6% w/v, about 2.7% w/v, about 2.8% w/v, about 2.9% w/v, about 3.0% w/v, about 3.1% w/v, about 3.2% w/v, about 3.3% w/v, about 3.4% w/v, about 3.5% w/v, about 3.6% w/v, about 3.7% w/v, about 3.8% w/v, about 3.9% w/v, about 4.0% w/v, about 4.1% w/v, about 4.2% w/v, about 4.3% w/v, about 4.4% w/v, about 4.5% w/v, about 4.6% w/v, about 4.7% w/v, about 4.8% w/v, about 4.9% w/v or about 5.0% of the sodium polyacrylate.

In a further embodiment, the nematode formulation comprises infective juveniles of entomopathogenic nematodes, water, sodium polyacrylate and carboxymethyl cellulose.

In yet another embodiment, the formulation comprises about 10.0% w/v to about 20.0% w/v infective juveniles of entomopathogenic nematodes, about 2.0% w/v to about 3.0% w/v sodium polyacrylate, about 1.0% w/v to about 2.0% w/v carboxymethyl cellulose, and about 75.0% w/v to about 87.0% w/v water.

In an embodiment, the formulation comprises about 1.0% w/v, about 1.1% w/v, about 1.2% w/v, about 1.3% w/v, about 1.4% w/v, about 1.5% w/v, about 1.6% w/v, about 1.7% w/v, about 1.8% w/v, about 1.9% w/v, about 2.0% w/v, about 2.1% w/v, about 2.2% w/v, about 2.3% w/v, about 2.4% w/v, about 2.5% w/v, about 2.6% w/v, about 2.7% w/v, about 2.8% w/v, about 2.9% w/v, about 3.0% w/v, about 3.1% w/v, about 3.2% w/v, about 3.3% w/v, about 3.4% w/v, about 3.5% w/v, about 3.6% w/v, about 3.7% w/v, about 3.8% w/v, about 3.9% w/v, about 4.0% w/v, about 4.1% w/v, about 4.2% w/v, about 4.3% w/v, about 4.4% w/v, about 4.5% w/v, about 4.6% w/v, about 4.7% w/v, about 4.8% w/v, about 4.9% w/v or about 5.0% sodium polyacrylate.

In another embodiment, the formulation comprises about 2.5% w/v sodium polyacrylate.

In an embodiment, the formulation comprises about 0.5% w/v, about 0.6% w/v, about 0.7% w/v, about 0.8% w/v, about 0.9% w/v, about 1.0% w/v, about 1.1% w/v, about 1.2% w/v, about 1.3% w/v, about 1.4% w/v, about 1.5% w/v, about 1.6% w/v, about 1.7% w/v, about 1.8% w/v, about 1.9% w/v, about 2.0% w/v, about 2.1% w/v, about 2.2% w/v, about 2.3% w/v, about 2.4% w/v, about 2.5% w/v, about 2.6% w/v, about 2.7% w/v, about 2.8% w/v, about 2.9% w/v or about 3.0% w/v carboxymethyl cellulose.

In another embodiment, the formulation comprises about 1.5% w/v carboxymethyl cellulose.

In a further embodiment, the nematode formulation comprises about 16.0% w/v nematodes, about 2.5% w/v sodium polyacrylate, about 1.5% w/v carboxymethyl cellulose and about 80.0% w/v water.

The infective juveniles of entomopathogenic nematodes comprised in the formulation can be obtained in a dry form or in a concentrated aqueous solution. The person skilled in the art would understand that the concentration of nematodes in the aqueous solution may vary according to the water concentration in the aqueous solution. The nematode concentration may also vary according to the nematode strain. For example, larger or cruiser-type nematodes weigh more than ambush-type nematodes.

It will be appreciated by the person skilled in the art that the total formulation percentage adds up to 100%.

In one embodiment, the cellulose-based nematode formulation is further coated with diatomaceous earth. In another embodiment, the cellulose-based nematode formulation is further coated with vermiculite. Vermiculite provides an additional moisture retaining barrier for the cellulose-based formulation and can also reduce microbial contamination of the cellulose-based formulation.

In other embodiments, concentrated aqueous solutions of infective juveniles of entomopathogenic nematodes can comprise additional elements that can improve nematode survival. These elements can include for example an inorganic salt mixture in addition to ascorbic acid. For example, sodium chloride (for example 11.25 g/L), potassium chloride (for example 0.525 g/L) and magnesium sulfate heptahydrate (for example 0.315 g/L) can be added to the concentrated aqueous solutions of infective juveniles of entomopathogenic nematodes.

The adjustment of the pH value of the formulation can also increase the nematode survivability. In one embodiment, the pH value of the nematode formulation ranges from about 2 to about 10. For example, the pH value of a nematode formulation comprising *Steinernema glaseri* nematodes is about 2 to about 10. In another embodiment, the pH value of the nematode formulation is about 6 to about 7.

In an embodiment, the formulation further comprises sodium alginate, one or more additional water-absorbing polymers, one or more additional cellulose compounds, and/or a thickening agent including for example guar gum, agar, gelatin and starch.

In an embodiment, the formulation is stored at a temperature ranging from about 1° C. to about 30° C. In another embodiment, the formulation is stored at a temperature ranging from about 12° C. to about 30° C., about 13° C. to about 29° C., about 14° C. to about 28° C., about 15° C. to about 27° C., about 16° C. to about 26° C., about 17° C. to about 25° C., about 18° C. to about 24° C., about 19° C. to about 23° C. or about 20° C. to about 22° C.

In an embodiment, the formulation is stored at a temperature ranging from about 20° C. to about 22° C.

The nematodes stored in the formulations made according to the methods herein disclosed retain infectivity for a prolonged duration, and the formulations can be stored for several months. As shown in Example 7, the nematodes stored in a cellulose-based composition (composition 2) can survive for at least three to at least six months. The nematodes comprised in the cellulose-based composition remained stable, suspended and in hibernation mode. Infectivity was also preserved after six months of storing. As shown in Example 10 and in Table 10, both *Steinernema glaseri* and *Heterorhabditis bacteriophora* nematode strains stored in a cellulose-based formulation for three and for six months were capable of infecting all of the *Galleria mellonella* larvae.

In an embodiment, the method comprises storing the formulation for a period of about one to about six months.

In another embodiment, the method comprises storing the formulation for at least a one month period, at least a two month period, at least a three month period, at least a four month period, at least a five month period or at least a six month period.

In further embodiment, the nematodes stored in the formulation herein disclosed retain infectivity for a period of about one to about six months.

In yet another embodiment, the nematodes stored in the formulation herein disclosed retain infectivity for least a one month period, at least a two month period, at least a three month period, at least a four month period, at least a five month period or at least a six month period.

After prolonged duration of nematodes in the cellulose-based formulation, some nematodes may die, including nematodes that are in direct contact with the exterior. For example, about 30.0%, about 25.0%, about 20.0%, about 15.0%, about 10.0%, about 5.0% or about 1.0% of nematodes stored in the cellulose-based formulation may die during storage without affecting infectivity of the remaining nematodes once contacted with the host insect.

In an embodiment, the nematode comprised in the formulation comprises insecticidal properties sufficient to induce death and/or damage to host insects such that additional insecticidal agent is not required.

In an embodiment, the method further comprises storing the formulation under aerobic conditions. The formulation made according to the methods herein disclosed does not require storage in an airtight container or in substantially anaerobic conditions. Substantially anaerobic conditions may be required, for example by storing nematodes under vacuum or in the presence of an inert gas, in order to prevent undesirable microbial growth. The presently disclosed formulations are less susceptible to microbial growth, in part because no nematode nutrient is added to the formulation.

Continuously stirring the nematode formulations also ensures an even distribution of nematode throughout the formulation and prevents the nematodes from settling at the bottom of the container in which the formulation is stirred.

In a further embodiment, the method further comprises continuously stirring the infective juveniles of entomopathogenic nematodes with water and the water-absorbing polymer and/or the cellulose compound until formation of the nematode gel to ensure suspension of the infective juveniles of entomopathogenic nematodes.

Another aspect is a method of preparing a nematode formulation suitable for prolonged storage, the steps comprising:
 a. mixing infective juveniles of entomopathogenic nematodes with an alginate solution to form an alginate gel;
 b. encapsulating the alginate gel by contacting said alginate gel with a complexing solution;
 c. removing the alginate capsules from the complexing solution;
 d. rinsing the alginate capsules in water to remove remaining complexing solution;
 e. coating the alginate capsules with a cellulose compound; and
 f. drying the alginate capsules,
wherein the infective juveniles of entomopathogenic nematodes are in suspension in the final formulation such that said nematodes have limited movement.

In an embodiment, the infective juveniles of entomopathogenic nematodes belong to a *Steinernema* species or a *Heterorhabditis* species.

In another embodiment, the nematodes belong to the following nematode strains: *Steinernema feltiae, Steinernema glaseri, Steinernema kraussei, Steinernema carpocapsae, Steinernema scapterisci, Steinernema riobrave, Heterorhabditis bacteriophora, Heterorhabditis megidis, Heterorhabditis indica* and/or *Heterorhabditis marelatus*.

In another embodiment, the infective juveniles of entomopathogenic nematodes are cruiser-type infective juveniles of entomopathogenic nematodes. Examples of cruiser-type infective juveniles of entomopathogenic nematodes include, without limitation, *Steinernema glaseri* and *Heterorhabditis bacteriophora*.

Entomopathogenic nematodes herein disclosed can be obtained as described above.

The formulation produced according to the methods disclosed above allows storage of nematodes for a prolonged duration. The nematodes are mixed in an alginate solution and the mixture is encapsulated into balls using a complexing agent. The alginate balls are coated with a cellulose compound and then further dried. The resulting formulation provides protection to the nematodes, allows sufficient oxygen supply by gas diffusion and provides sufficient moisture to prevent desiccation of the nematodes.

Alginate, or alginic acid, is a highly water absorbent polysaccharide obtained from the cell walls of brown algae and can absorb 200-300 times its own weight in water. The person skilled in the art would understand that any alginate derivatives or salts having absorbent properties can be used in the alginate solution. For example, sodium alginate is the sodium salt of alginate.

In an embodiment, the alginate solution comprises an alginate compound and water.

In another embodiment, the alginate solution comprises about 1.0% w/v to about 5.0% w/v of an alginate compound, optionally about 3.0% w/v of an alginate compound.

In one embodiment, the alginate solution comprise about 1.0% w/v, about 1.1% w/v, about 1.2% w/v, about 1.3% w/v, about 1.4% w/v, about 1.5% w/v, about 1.6% w/v, about 1.7% w/v, about 1.8% w/v, about 1.9% w/v, about 2.0% w/v, about 2.1% w/v, about 2.2% w/v, about 2.3% w/v, about 2.4% w/v, about 2.5% w/v, about 2.6% w/v, about 2.7% w/v, about 2.8% w/v, about 2.9% w/v, about 3.0% w/v, about 3.1% w/v, about 3.2% w/v, about 3.3% w/v, about 3.4% w/v, about 3.5% w/v, about 3.6% w/v, about 3.7% w/v, about 3.8% w/v, about 3.9% w/v, about 4.0% w/v, about 4.1% w/v, about 4.2% w/v, about 4.3% w/v, about 4.4% w/v, about 4.5% w/v, about 4.6% w/v, about 4.7% w/v, about 4.8% w/v, about 4.9% w/v or about 5.0% w/v of the alginate compound.

In an embodiment, the alginate compound is sodium alginate.

In another embodiment, the alginate solution comprises about 1.0% w/v to about 5.0% w/v sodium alginate, optionally about 3.0% w/v sodium alginate.

In an embodiment, the alginate solution comprise about 1.0% w/v, about 1.1% w/v, about 1.2% w/v, about 1.3% w/v, about 1.4% w/v, about 1.5% w/v, about 1.6% w/v, about 1.7% w/v, about 1.8% w/v, about 1.9% w/v, about 2.0% w/v, about 2.1% w/v, about 2.2% w/v, about 2.3% w/v, about 2.4% w/v, about 2.5% w/v, about 2.6% w/v, about 2.7% w/v, about 2.8% w/v, about 2.9% w/v, about 3.0% w/v, about 3.1% w/v, about 3.2% w/v, about 3.3% w/v, about 3.4% w/v, about 3.5% w/v, about 3.6% w/v, about 3.7% w/v, about 3.8% w/v, about 3.9% w/v, about 4.0% w/v, about 4.1% w/v, about 4.2% w/v, about 4.3% w/v, about 4.4% w/v, about 4.5% w/v, about 4.6% w/v, about 4.7% w/v, about 4.8% w/v, about 4.9% w/v or about 5.0% w/v sodium alginate.

In one embodiment, the alginate solution comprises about 3.0% w/v sodium alginate and about 97.0% w/v water.

In an embodiment, the water is deionized water. In another embodiment, the water is sterilized water.

In one embodiment, the alginate solution is mixed with infective juveniles of entomopathogenic nematodes to form an alginate gel.

The infective juveniles of entomopathogenic nematodes can be obtained using methods herein described.

In one embodiment, the alginate gel comprises about 10.0% w/v to about 20.0% w/v infective juveniles of entomopathogenic nematodes. In another embodiment, the alginate gel comprises about 2.0% w/v to about 20.0% w/v infective juveniles of entomopathogenic nematodes. In one embodiment, the infective juveniles of entomopathogenic nematodes are in a concentrated aqueous solution.

In an embodiment, the alginate gel comprise about 2% w/v, about 2.5% w/v, about 3% w/v, about 4% w/v, about 5% w/v, about 6% w/v, about 7% w/v, about 8% w/v, about 9% w/v, about 10.0% w/v, about 10.5% w/v, about 11.0% w/v, about 11.5% w/v, about 12.0% w/v, about 12.5% w/v, about 13.0% w/v, about 13.5% w/v, about 14.0% w/v, about 14.5% w/v, about 15.0% w/v, about 15.5% w/v, about 16.0% w/v, about 16.5% w/v, about 17.0% w/v, about 17.5% w/v, about 18.0% w/v, about 18.5% w/v, about 19.0% w/v, about 19.5% w/v, or about 20.0% w/v infective juveniles of entomopathogenic nematodes.

In one embodiment, the alginate gel comprises about 16.0% w/v infective juveniles of entomopathogenic nematodes. In another embodiment, the alginate gel comprises about 3.0% w/v infective juveniles of entomopathogenic nematodes.

In another embodiment, the alginate gel comprises about 16.0% w/v infective juveniles of entomopathogenic nematodes, about 3.0% w/v of an alginate compound and about 81.0% w/v water. In another embodiment, the alginate gel comprises about 3.0% w/v infective juveniles of entomopathogenic nematodes, about 4.0% w/v of an alginate compound and about 93.0% w/v water.

In another embodiment, the alginate capsules comprise about 16.0% w/v infective juveniles of entomopathogenic nematodes, about 3.0% w/v calcium alginate and about 81.0% w/v water. In another embodiment, the alginate capsules comprises about 3.0% w/v infective juveniles of entomopathogenic nematodes, about 4.0% w/v of calcium alginate and about 93.0% w/v water In another embodiment, the alginate gel comprises a mixture of sodium alginate and water-absorbing polymers and/or a thickening agent including for example a cellulose compound, sodium polyacrylate, guar gum, agar, gelatin and starch.

Complexing agents are known in the art and are used to encapsulate alginate solutions. For example, lanthanum chloride, ferric chloride, cobaltous chloride, calcium nitrate and calcium hydroxide can be used. Once a complexing solution, comprising water and a complexing agent, is contacted with an alginate solution, alginate capsules are formed. For example, when sodium alginate and calcium chloride are contacted, calcium alginate capsules are formed as well as a salt water byproduct.

In an embodiment, a complexing solution comprises a complexing agent and water.

In an embodiment, the complexing solution comprises about 0.3% w/v, about 0.4% w/v, about 0.5% w/v, about 0.6% w/v, about 0.7% w/v, about 0.8% w/v, about 0.9% w/v, about 1.0% w/v, about 1.1% w/v, about 1.2% w/v, about 1.3% w/v, about 1.4% w/v, about 1.5% w/v, about 1.6% w/v, about 1.7% w/v, about 1.8% w/v, about 1.9% w/v, about 2.0% w/v, about 2.1% w/v, about 2.2% w/v, about 2.3% w/v, about 2.4% w/v, about 2.5% w/v, about 2.6% w/v, about 2.7% w/v, about 2.8% w/v, about 2.9% w/v, about 3.0% w/v, about 3.1% w/v, about 3.2% w/v, about 3.3% w/v, about 3.4% w/v, about 3.5% w/v, about 3.6% w/v, about 3.7% w/v, about 3.8% w/v, about 3.9% w/v or about 4.0% w/v of the complexing agent.

In an embodiment, the complexing agent is calcium chloride.

In an embodiment, the complexing solution comprises about 0.3% w/v, about 0.4% w/v, about 0.5% w/v, about 0.6% w/v, about 0.7% w/v, about 0.8% w/v, about 0.9% w/v, about 1.0% w/v, about 1.1% w/v, about 1.2% w/v, about 1.3% w/v, about 1.4% w/v, about 1.5% w/v, about 1.6% w/v, about 1.7% w/v, about 1.8% w/v, about 1.9% w/v, about 2.0% w/v, about 2.1% w/v, about 2.2% w/v, about 2.3% w/v, about 2.4% w/v, about 2.5% w/v, about 2.6% w/v, about 2.7% w/v, about 2.8% w/v, about 2.9% w/v, about 3.0% w/v, about 3.1% w/v, about 3.2% w/v, about 3.3% w/v, about 3.4% w/v, about 3.5% w/v, about 3.6% w/v, about 3.7% w/v, about 3.8% w/v, about 3.9% w/v or about 4.0% w/v calcium chloride.

In another embodiment, the complexing solution comprises about 0.5% w/v to about 1.5% w/v calcium chloride. In one embodiment, the complexing solution comprises about 0.8% w/v calcium chloride.

In an embodiment, the alginate capsules obtained in step b) remain in the complexing solution for about 30 minutes.

In another embodiment, the alginate capsules remain in the complexing solution for about 40 minutes, about 50 minutes, about 60 minutes, about 90 minutes, about 120 minutes, about 150 minutes, about 2 hours, about 3 hours, about 5 hours or about 10 hours.

Once the alginate gel is contacted with the complexing solution, the alginate capsules are produced as well as a salt water by product.

In one embodiment, the capsules are comprised of calcium alginate. The person skilled in the art will understand that alginate capsules can be obtained using any known alginate solution and complexing solution.

In another embodiment, the alginate capsules comprise about 2% w/v, about 2.5% w/v, about 3% w/v, about 4% w/v, about 5% w/v, about 6% w/v, about 7% w/v, about 8% w/v, about 9% w/v, about 10.0% w/v, about 10.5% w/v, about 11.0% w/v, about 11.5% w/v, about 12.0% w/v, about 12.5% w/v, about 13.0% w/v, about 13.5% w/v, about 14.0% w/v, about 14.5% w/v, about 15.0% w/v, about 15.5% w/v, about 16.0% w/v, about 16.5% w/v, about 17.0% w/v, about 17.5% w/v, about 18.0% w/v, about 18.5% w/v, about 19.0% w/v, about 19.5% w/v, or about 20.0% w/v infective juveniles of entomopathogenic nematodes.

In one embodiment, the alginate capsules comprise about 16.0% w/v infective juveniles of entomopathogenic nematodes. In one embodiment, the alginate capsules comprise about 3.0% w/v infective juveniles of entomopathogenic nematodes.

In one embodiment, the alginate capsules comprise about 2.0% w/v to about 20.0% w/v nematodes, about 1.0% w/v to about 5.0% w/v calcium alginate and about 75.0% w/v to about 97.0% w/v water.

In another embodiment, the alginate capsules comprise about 16.0% w/v infective juveniles of entomopathogenic nematodes, about 3.0% w/v calcium alginate and about 81.0% w/v water. In another embodiment, the alginate capsules comprise about 3.0% w/v infective juveniles of entomopathogenic nematodes, about 4.0% w/v of calcium alginate and about 93.0% w/v water.

In another embodiment, prior to coating the alginate capsules with a cellulose compound as described in step e), the alginate capsules are dried for at least 3 hours.

For example, the alginate capsules are dried for at least 1 hour, at least 2 hours, at least 3 hours, at least 4 hours, at least 5 hours, at least 6 hours, at least 7 hours, at least 9 hours, at least 9 hours, at least 10 hours, or at least 15 hours prior to coating of said alginate capsules with the cellulose compound.

Cellulose is a chemical compound that is water soluble and non-toxic for nematodes. The cellulose creates a gel bond by encapsulating the alginate formulation and this provides prolonged storage. The cellulose coating provides an additional barrier for the alginate formulation, thus maintaining moisture inside the alginate formulation and preventing desiccation of the nematodes. The cellulose coating also provides a shield preventing or reducing microbial contamination of the alginate formulation.

In one embodiment, the alginate capsules obtained in step e) are covered in cellulose. In one embodiment, the alginate capsules are placed in a container and cellulose powder is sprinkled over top the alginate capsules and mixed continuously until all the surfaces of the alginate capsules are fully covered in cellulose. No exact amount of cellulose is used and the quantity may vary. For example, if a form fill sealing machine is used, additional cellulose may be added to ease the packaging process.

In an embodiment, the cellulose compound is cellulose acetate, carboxymethyl cellulose, ethyl methyl cellulose, hydroxypropyl cellulose or methylcellulose. The person skilled in the art would understand that other known cellulose compounds presenting similar properties to the cellulose compounds herein described can be used.

In one embodiment, the cellulose is cellulose acetate.

In yet a further embodiment, the alginate capsules obtained in step e) are dried for about 1 to about 5 days.

In an embodiment, the alginate capsules obtained in step e) are dried for about 1 day, for about 2 days, for about 3 days, for about 4 days or for about 5 days.

Once the alginate capsules have been dried according to step f), optionally for about 2 or about 3 days, optionally at room temperature, they will lose water content such that the final alginate formulation will have less water than in the alginate capsules obtained in step b).

Drying the alginate capsules according to step f) reduces the water content of the alginate balls and increases the nematode concentration compared to the alginate capsules prior to the drying step.

In an embodiment, the alginate formulation comprises about 2% w/v, about 2.5% w/v, about 3% w/v, about 4% w/v, about 5% w/v, about 6% w/v, about 7% w/v, about 8% w/v, about 9% w/v, about 10.0% w/v, about 10.5% w/v, about 11.0% w/v, about 11.5% w/v, about 12.0% w/v, about 12.5% w/v, about 13.0% w/v, about 13.5% w/v, about 14.0% w/v, about 14.5% w/v, about 15.0% w/v, about 15.5% w/v, about 16.0% w/v, about 16.5% w/v, about 17.0% w/v, about 18.0% w/v, about 18.5% w/v, about 19.0% w/v, about 19.5% w/v, about 20.0% w/v, about 20.5% w/v, about 21.0% w/v, about 21.5% w/v, about 22.0% w/v, about 22.5% w/v, about 23.0% w/v, about 23.5% w/v, about 24.0% w/v, about 24.5% w/v, about 25.0% w/v, about 25.5% w/v, about 26.0% w/v, about 26.5% w/v, about 27.0% w/v, about 27.5% w/v, about 28.0% w/v, about 28.5% w/v, about 29.0% w/v, about 29.5% w/v or about 30.0% infective juveniles of entomopathogenic nematodes.

In another embodiment, the alginate formulation comprises about 12.0% w/v to about 28.0% w/v, about 14.0% w/v to about 26.0% w/v, about 16.0% w/v to about 24.0% or about 18.0% w/v to about 22.0% w/v infective juveniles of entomopathogenic nematodes.

In an embodiment, the alginate formulation comprises a water content less than 94% w/v, less than 93% w/v, less than 90% w/v, less than 85% w/v, less than 80% w/v, less than 79% w/v, less than 78% w/v, less than 77% w/v less than 76% w/v, less than 75% w/v, less than 74% w/v, less than 73% w/v, less than 72% w/v, less than 71% w/v, less than 70% w/v, less than 69% w/v, less than 68% w/v, less than 67% w/v, less than 66% w/v or less than 65% w/v.

In an embodiment, the final formulation comprises a water content less than about 80% w/v or less than about 70% w/v.

The alginate capsules obtained in step e) can be dried at a temperature ranging from about 1° C. to about 30° C.

In an embodiment, the alginate capsules are dried at a temperature ranging from about 1° C. to about 30° C., about 5° C. to about 29° C., about 10° C. to about 28° C., about 12° C. to about 27° C., about 14° C. to about 26° C., about 16° C. to about 25° C., about 18° C. to about 24° C. about 19° C. to about 23° C. or about 20° C. to about 22° C.

The presently disclosed alginate formulation is suitable for storage in exterior conditions and can withstand different temperature ranges.

In one embodiment, the formulation is stored at a temperature ranging from about −10° C. to about 30° C. In one embodiment, the formulation is stored at a temperature ranging from about −5° C. to about 28° C., about 1° C. to about 25° C., about 10° C. to about 23° C., about 15° C. to about 22° C. or about 18° C. to about 20° C.

In an embodiment, the nematodes can withstand freezing and thawing conditions. As shown in Example 4, the alginate formulation can be frozen for several months and thawed without affecting survivability of the nematodes. In an embodiment, several cycles of freezing and thawing also do not affect survivability of the nematodes.

The nematodes stored in the formulations made according to the methods herein disclosed retain infectivity for a prolonged duration, and the formulations can be stored for several months. As shown in Example 5 and in Table 2, both *Steinernema glaseri* and *Heterorhabditis bacteriophora* nematode strains stored in an alginate formulation for three, six and ten months were capable of infecting all of the *Galleria mellonella* larvae.

In another embodiment, the method further comprises storing the formulation for about one to about twelve months, optionally about three to about ten months.

In another embodiment, the method comprises storing the formulation for at least a one month period, at least a two month period, at least a three month period, at least a four month period, at least a five month period, at least a six month period, at least a seven month period, at least a eight month period, at least a nine month period, at least a ten month period, at least an eleven month period or at least a twelve month period.

In further embodiment, the nematodes stored in the formulation herein disclosed retain infectivity for a period of about one to about six months, optionally about three to about six months.

In yet another embodiment, the nematodes stored in the formulation herein disclosed retain infectivity for least a one month period, at least a two month period, at least a three month period, at least a four month period, at least a five month period or at least a six month period.

After prolonged duration of nematodes in the alginate formulation, some nematodes may die, including nematodes that are in direct contact with the exterior. For example, about 30.0%, about 25.0%, about 20.0%, about 15.0%, about 10.0%, about 5.0% or about 1.0% of nematodes stored in the alginate formulation may die during storage without affecting infectivity of the remaining nematodes once contacted with the host insect.

In an embodiment, the nematode comprised in the formulation comprise insecticidal properties sufficient to induce death and/or damage to host insects such that additional insecticidal agent is not required.

In an embodiment, the method further comprises storing the formulation under aerobic conditions. The formulation made according to the methods herein disclosed does not require storage in an airtight container or in substantially anaerobic conditions. Substantially anaerobic conditions may be required, for example by storing nematodes under vacuum or in the presence of an inert gas, in order to prevent undesirable microbial growth. The presently disclosed formulations are less susceptible to microbial growth, in part because no nematode nutrient is added to the formulation.

For example, the infectivity of the infective juveniles of entomopathogenic nematodes is retained for at least 80%, at least 85%, at least 90%, at least 95% or at least 99%, or 100% of the infective juveniles of entomopathogenic nematode for a storage period of at least 2 weeks, at least 1 month, at least 2 months, at least 3 months, at least 4 months, at least 5 months, at least 6 months, at least 7 months, at least 8 months, at least 9 months, at least 10 months, at least 11 months or at least 12 months.

In an embodiment, the infective juveniles of entomopathogenic nematode comprised in the alginate formulation comprise insecticidal properties sufficient to induce death and/or damage to host insects such that additional insecticidal agent is not required.

Continuously stirring the alginate gel as described in step a) also ensures an even distribution of nematodes throughout the formulation and prevents the nematodes from settling at the bottom of the container in which the formulation is stirred.

In another embodiment, the method further comprises continuously stirring the infective juveniles of entomopathogenic nematodes with the alginate solution until formation of the alginate gel to ensure suspension of the infective juveniles of entomopathogenic nematodes.

A further aspect is a nematode formulation obtained according to the methods herein disclosed.

Yet another aspect includes a method of biologically controlling pests comprising diluting in water a nematode formulation obtained according to the methods herein disclosed and applying a resulting composition to an area subject to pest infestation.

A further aspect includes a method of biologically controlling pests comprising degrading a nematode formulation obtained according to the methods herein disclosed and applying the nematode formulation to an area subject to pest infestation.

In an embodiment, the nematode formulation comprising alginate capsules is applied directly to the affected area. The nematode formulation degrades slowly over a period of about one day to about one week, depending on temperature, humidity and watering of affected area. For example, the formulation can be sprinkled directly to the affected area. For example, the formulation can be added to pre soil mix and the pre soil mix can be added to the affected area. For example, the formulation can be inserted in nematode permeable pouches and the pouches can be inserted into the ground.

Another aspect is a method of storing and transporting nematodes comprising:
a. obtaining a nematode formulation according to the methods herein disclosed;
b. optionally contacting the nematode formulation with a carrier; and
c. packaging the nematode formulation in a container suitable for storage and transport, optionally a nematode permeable pouch, optionally using a form fill sealing machine,
wherein the carrier is selected from any one of vermiculite, clay, sand, dirt, peat and coir.

The features of the nematode permeable pouch suitable for storing entomopathogenic nematodes are disclosed in U.S. Patent Application No. US-2015-0075116 A1, filed Sep. 16, 2013, which is incorporated herein by reference in its entirety. Briefly, the nematode permeable pouch may comprise a plurality of pores which provide the permeability of the pouch, and each of the plurality of pores may be sized large enough to permit the passage of the nematodes and of liquid, but sized small enough to prevent passage of larger particles. In an embodiment, a size of each of the plurality of pores may be less than 2 mm. In another embodiment, a size of each of the plurality of pores may be between 1.5 mm and 2 mm.

In one embodiment, the cellulose-based formulation obtained according to the methods herein described is packaged, using a form fill sealing machine, in a nematode permeable pouch, for example a tea bag. The cellulose-based nematode formulation packaged in the nematode permeable pouch can be stored for several months at room temperature, under aerobic conditions.

In one embodiment, the cellulose-based nematode formulation packaged in the nematode permeable pouch can be stored for at least 1 month, at least 2 months, at least 3 months, at least 4 months, at least 5 months and at least 6 months.

In order to use the cellulose-based formulation, the nematode permeable pouch is placed in a receptacle containing water and the formulation is dissolved in said water. The nematode permeable pouch allows the nematodes to exit the pouch. The water-nematode mixture is then ready to be applied to an area subject to pest infestation.

In another example, the alginate formulation obtained according to the methods herein described is packaged using a form fill sealing machine, in a nematode permeable pouch, for example a tea bag. The alginate formulation packaged in a tea bag can be stored for several months at room temperature, under aerobic conditions.

In one embodiment, the alginate nematode formulation packaged in the nematode permeable pouch can be stored for at least 1 month, at least 2 months, at least 3 months, at least 4 months, at least 5 months and at least 6 months.

The alginate formulation can be used by placing alginate capsules in proximity of an area subject to pest infestation. Water and time will allow degrading of the alginate formulation and subsequent release of the nematodes. For, the alginate formulation can be sprinkled directly to the affected area. For example, the alginate formulation can be added to pre soil mix and the pre soil mix can be added to the affected area. For example, the alginate formulation can be inserted in nematode permeable pouches and the pouches can be inserted into the ground.

A further aspect is a cellulose-based formulation comprising about 10% w/v to about 20% w/v of infective juveniles of entomopathogenic nematodes as disclosed herein, about 75% w/v to about 83% w/v water as disclosed herein, about 2.0% w/v to about 3.0% w/v of a water-absorbing polymer as disclosed herein and about 1.0% w/v to about 2.0% w/v of a cellulose compound as disclosed herein, and wherein the infective juveniles of entomopathogenic nematodes are in suspension such that said nematodes have limited movement.

As described herein, the infective juveniles of entomopathogenic nematodes belong to a *Steinernema* species or a *Heterorhabditis* species. In another embodiment, the infective juveniles of entomopathogenic nematodes are cruiser-type infective juveniles of entomopathogenic nematodes. Examples of cruiser-type infective juveniles of entomopathogenic nematodes include, without limitation, *Steinernema glaseri* and *Heterorhabditis bacteriophora*.

In one embodiment, the water-absorbing polymer is sodium polyacrylate.

In another embodiment, the cellulose compound is carboxymethyl cellulose.

In yet another embodiment, the cellulose-based formulation comprises about 10% w/v to about 20% w/v of infective juveniles of entomopathogenic nematodes, about 75% w/v to about 87% w/v water, about 2.0% w/v to about 3.0% w/v of a sodium polyacrylate and about 1.0% w/v to about 2.0% w/v of a carboxymethyl cellulose.

In a further embodiment, the cellulose-based formulation comprises about 16.0% w/v nematodes, about 2.5% w/v sodium polyacrylate, about 1.5% w/v carboxymethyl cellulose and about 81.0% w/v water.

In an embodiment, the cellulosed-based formulation is stored for a period of about one to about six months, optionally about three to about six months.

In further embodiment, the nematodes stored in the cellulosed-based formulation herein disclosed retain infectivity for a period of about one to about six months, optionally about three to about six months.

In an embodiment, the cellulose-based formulation is stored at a temperature ranging from about 1° C. to about 30° C. In another embodiment, the formulation is stored at a temperature ranging from about 12° C. to about 30° C., about 13° C. to about 29° C., about 14° C. to about 28° C., about 15° C. to about 27° C., about 16° C. to about 26° C., about 17° C. to about 25° C., about 18° C. to about 24° C., about 19° C. to about 23° C. or about 20° C. to about 22° C.

In an embodiment, the nematode comprised in the cellulose-based formulation comprises insecticidal properties sufficient to induce death and/or damage to host insects such that additional insecticidal agent is not required.

Another aspect is an alginate formulation comprising about 10.0% w/v to about 30.0% w/v infective juveniles of entomopathogenic nematodes as disclosed herein, wherein the alginate formulation is further coated with a cellulose compound disclosed herein, and wherein the infective juveniles of entomopathogenic nematodes are in suspension such that said nematodes have limited movement.

As described herein, the infective juveniles of entomopathogenic nematodes belong to a *Steinernema* species or a *Heterorhabditis* species. In another embodiment, the infective juveniles of entomopathogenic nematodes are cruiser-type infective juveniles of entomopathogenic nematodes. Examples of cruiser-type infective juveniles of entomopathogenic nematodes include, without limitation, *Steinernema glaseri* and *Heterorhabditis bacteriophora*.

In one embodiment, the alginate formulation comprises about 2.0% w/v, about 3.0% w/v, about 5.0% w/v, about 10.0% w/v, about 10.5% w/v, about 11.0% w/v, about 11.5% w/v, about 12.0% w/v, about 12.5% w/v, about 13.0% w/v, about 13.5% w/v, about 14.0% w/v, about 14.5% w/v, about 15.0% w/v, about 15.5% w/v, about 16.0% w/v, about 16.5% w/v, about 17.0% w/v, about 18.0% w/v, about 18.5% w/v, about 19.0% w/v, about 19.5% w/v, about 20.0% w/v, about 20.5% w/v, about 21.0% w/v, about 21.5% w/v, about 22.0% w/v, about 22.5% w/v, about 23.0% w/v, about 23.5% w/v, about 24.0% w/v, about 24.5% w/v, about 25.0% w/v, about 25.5% w/v, about 26.0% w/v, about 26.5% w/v, about 27.0% w/v, about 27.5% w/v, about 28.0% w/v, about 28.5% w/v, about 29.0% w/v, about 29.5% w/v or about 30.0% infective juveniles of entomopathogenic nematodes.

In one embodiment, the alginate formulation is obtained by contacting an alginate solution, herein disclosed, with infective juveniles of entomopathogenic nematodes, and mixing a resulting nematode gel with a complexing solution, herein disclosed, to obtain alginate capsules.

In one embodiment, the alginate solution comprises an alginate compound and water.

In another embodiment, the alginate compound is sodium alginate.

In another embodiment, the alginate solution comprises about 3.0% w/v sodium alginate and about 97.0% w/v water. In another embodiment, the alginate solution comprises 6.0% w/v sodium alginate and about 94.0% w/v water.

In one embodiment, the complexing solution comprises a complexing agent and water.

In one embodiment, the complexing agent is calcium chloride.

In one embodiment, the complexing solution comprises about 0.5% w/v to about 1.5% w/v calcium chloride. In one embodiment, the complexing solution comprises about 0.8% w/v calcium chloride.

In one embodiment, the alginate formulation comprises about 1.0% w/v to about 10.0% w/v calcium alginate, optionally about 2.0% w/v to about 8.% w/v calcium alginate or about 3.0% w/v to about 6.0% w/v calcium alginate.

In an embodiment, the alginate capsules comprise about 1.0% w/v, about 1.1% w/v, about 1.2% w/v, about 1.3% w/v, about 1.4% w/v, about 1.5% w/v, about 1.6% w/v, about 1.7% w/v, about 1.8% w/v, about 1.9% w/v, about 2.0% w/v, about 2.1% w/v, about 2.2% w/v, about 2.3% w/v, about 2.4% w/v, about 2.5% w/v, about 2.6% w/v, about 2.7% w/v, about 2.8% w/v, about 2.9% w/v, about 3.0% w/v, about 3.1% w/v, about 3.2% w/v, about 3.3% w/v, about 3.4% w/v, about 3.5% w/v, about 3.6% w/v, about 3.7% w/v, about 3.8% w/v, about 3.9% w/v, about 4.0% w/v, about 4.1% w/v, about 4.2% w/v, about 4.3% w/v, about 4.4% w/v, about 4.5% w/v, about 4.6% w/v, about 4.7% w/v, about 4.8% w/v, about 4.9% w/v, about 5.0% w/v, about 5.1% w/v, about 5.2% w/v, about 5.3% w/v, about 5.4% w/v, about 5.5% w/v, about 5.6% w/v, about 5.7% w/v, about 5.8% w/v, about 5.9% w/v or about 6.0% w/v calcium alginate.

In another embodiment, the cellulose compound is cellulose acetate.

In an embodiment, the alginate formulation comprises a water content less than 94% w/v, less than 93% w/v, less than 90% w/v, less than 85% w/v, 80% w/v, less than 80% w/v, less than 79% w/v, less than 78% w/v, less than 77% w/v less than 76% w/v, less than 75% w/v, less than 74% w/v, less than 73% w/v, less than 72% w/v, less than 71% w/v, less than 70% w/v, less than 69% w/v, less than 68% w/v, less than 67% w/v, less than 66% w/v or less than 65% w/v.

In an embodiment, the alginate formulation is stored for a period of about one to about twelve months, optionally six to about ten months.

In further embodiment, the nematodes stored in the alginate formulation herein disclosed retain infectivity for a period of about one to about twelve months, optionally six to about ten months.

In one embodiment, the formulation is stored at a temperature ranging from about −10° C. to about 30° C.

In an embodiment, the nematode comprised in the alginate formulation comprises insecticidal properties sufficient to induce death and/or damage to host insects such that additional insecticidal agent is not required.

The above disclosure generally describes the present application. A more complete understanding can be obtained by reference to the following specific examples. These examples are described solely for the purpose of illustration and are not intended to limit the scope of the application. Changes in form and substitution of equivalents are contemplated as circumstances might suggest or render expedient. Although specific terms have been employed herein, such terms are intended in a descriptive sense and not for purposes of limitation.

The following non-limiting examples are illustrative of the present disclosure:

EXAMPLES

Examples Related to Alginate Formulations

Example 1: Survivability of Nematodes in Alginate Balls

The survivability of *Steinernema feltiae* nematodes stored in alginate balls at room temperature was tested. The alginate balls were made by dissolving sodium alginate in deionized water and then added the nematodes to the alginate mixture (81% w/v deionized water, 3% w/v sodium alginate, 16% w/v *Steinernema feltiae* nematodes).

The alginate balls were produced by contacting the alginate-nematode mixture with a complexing solution comprising 0.8% w/v calcium chloride and 99.2% w/v deionized water for about 30 minutes. The balls were then removed from the complexing solution and rinsed in water.

Figure 1:
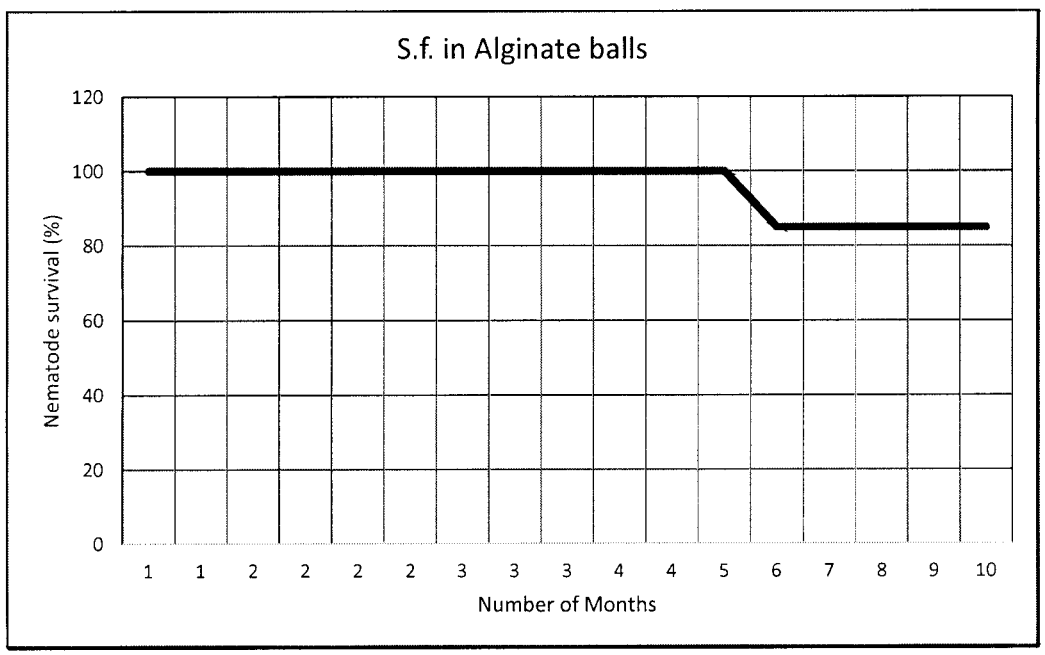

As shown in Table 1 and in FIG. 1, the nematode stored in alginate balls at room temperature survive several months. After nine months of storage, 85% of the nematodes survived. Also, no contaminates were detected in the alginate balls throughout the storage duration, as shown in Table 1.

TABLE 1

Survivability of the nematodes in alginate balls

| Sample date | Alginate ball condition | Survivability of the nematodes (%) |
|---|---|---|
| May 23, 2014 | No contaminates | 100 |
| May 30, 2014 | No contaminates | 100 |
| Jun. 4, 2014 | No contaminates | 100 |
| Jun. 11, 2014 | No contaminates | 100 |
| Jun. 19, 2014 | No contaminates | 100 |
| Jun. 24, 2014 | No contaminates | 100 |
| Jul. 2, 2014 | No contaminates | 100 |
| Jul. 11, 2014 | No contaminates | 100 |
| Jul. 23, 2014 | No contaminates | 100 |
| Aug. 15, 2014 | No contaminates | 100 |
| Aug. 29, 2014 | No contaminates | 100 |
| Sep. 16, 2014 | No contaminates | 100 |
| Oct. 17, 2014 | No contaminates | 85 |
| Nov. 24, 2014 | No contaminates | 85 |
| Dec. 15, 2014 | No contaminates | 85 |
| Jan. 13, 2015 | No contaminates | 85 |
| Feb. 12, 2015 | No contaminates | 85 |

Example 2: Improved Alginate Formulation

The purpose of the experiment was to identify a moisture retention coating for the alginate balls.

A clay type coating was first tested but the clay coating was found to dry out the alginate balls too much. The nematodes in the alginate balls survived 2-3 days before being completely dried out. Different types of plasters and molding products were tested as coatings for the alginate balls, however rather than forming a hard plaster shell on the outside while keeping the alginate balls moist, the plaster and molding powders consistently drew water from the alginate balls. Corn starch was tested and found to work as a coating and did not dry the balls out initially, but it did create bacterial growth due to being prone to microbial contamination. Adding corn starch directly into the mixture was tested. The alginate balls were less likely to leak by directly adding corn starch to the mixture but were also more prone to contamination. Cellulose was tested as a coating agent and was found not to be prone to microbial contamination and also not to dry out the alginate balls. The cellulose coated alginate balls were stored for several months and remained stable. The cellulose acted as a gel shield, keeping moisture within the alginate ball.

Example 3: Method of Producing a Stable Alginate Nematode Formulation

Materials:
  sodium alginate (3% w/v)
  deionized water (81% w/v)
  *Steinernema feltiae* nematodes in suspension (16.2% w/v)
  calcium chloride (0.8% w/v)
  carboxymethyl cellulose coating
Methods:
A vortex was created using a drill in 10 L of deionized water in a pot, and then the sodium alginate was poured into the vortex. A 1:1 ratio between sodium alginate and calcium chloride was used (1 L of alginate solution=30 g sodium alginate; 1 L of calcium chloride solution=7.5 g calcium chloride. After a few minutes the alginate solution was fully dissolved and had a gel like texture. A package of *S. feltiae* nematodes was added to the alginate solution and the mixture was slowly mixed with the drill.

110.25 g of calcium chloride was dissolved in 15 L of deionized water and the mixture was poured into a large container. The alginate nematode solution was poured into the calcium chloride solution to form alginate balls. The balls were left in the calcium chloride solution for 30 minutes to strengthen the outer shell. Afterwards the alginate balls were removed from the calcium chloride solution and placed into a bath of deionized water for several minutes to remove remaining calcium chloride. The alginate balls were removed from the bath of deionized water and spread evenly onto a plastic sheet. The balls were allowed to dry for a few hours.

Carboxymethyl cellulose was sprinkled on the alginate balls while moving the tray to coat the balls evenly. The alginate balls were dried for 2-3 days at room temperature. Once the alginate balls were dry and light, they were packaged using the form fill sealing machine.

Example 4: Alginate Ball Soil Tests

The purpose of this experiment was to determine the insecticidal infectivity and survivability of the *Steinernema feltiae* filled alginate balls made according to the methods in Example 3. This was achieved by conducting a series of tests, the first test was to determine if the nematodes could survive in the alginate balls in frozen soil by putting 2 small petri dishes with soil and alginate balls into a freezer. The second test was to determine if the nematodes could survive in the alginate balls at 27 degree Celsius soil by putting 2 small petri dishes with soil and alginate balls into an incubator. The third test was a control, wherein 2 small petri dishes with soil and alginate balls were left at room temperature to determine if the alginate balls would encourage the growth of mold. The fourth test was to determine the insecticidal infectivity of the alginate balls in soil. This was accomplished by placing 8 *Galleria mellonella* larvae into a soil bedded petri dish and then placing 8 *Steinernema feltiae* filled alginate balls within the soil.

Method:

- First Test: Freezing of Alginate Balls
- Soil used was topsoil by Premier tech
- Soil was put into 2 small petri dishes
- Each petri dish contained 8 *Steinernema feltiae* filled alginate balls
- The dishes were sealed with parafilm and put into a freezer
- Second Test: Heating of Alginate Balls
- Soil was put into 2 small petri dishes
- Each petri dish contained 8 *Steinernema feltiae* filled alginate balls
- The dishes were sealed with parafilm and put into an incubator at 27 degrees Celsius
- Third Test: Room Temperature Storing of Alginate Balls
- Soil was put into 2 small petri dishes
- Each petri dish contained 8 *Steinernema feltiae* filled alginate balls
- The dishes were sealed with parafilm and left at room temperature
- Fourth Test: Alginate Ball Insecticidal Infectivity
- Soil was put into 4 small petri dishes
- Each petri dish contained 8 *Steinernema feltiae* filled alginate balls
- Each petri dish contained 8 *Galleria mellonella*
- The soil was lightly damped to allow nematode movement
- The dishes were sealed with parafilm and put into an incubator Results:

Freezing of alginate balls: During the first test, the alginate balls were frozen in soil for 48 hours. The alginate balls thawed before proceeding to observe the nematodes. It was observed that the nematodes surrounding the outer cellulose shell of the alginate ball died, due to the direct cold temperature. However, the nematodes within the cellulose shell and those deep within the alginate ball were not affected by the freezing temperature. The alginate balls were thawed to verify the survivability of the nematodes during the freezing period. The nematode survivability did not change, indicating that longer freezing periods did not negatively affect the nematode survivability. Further testing of the alginate balls was carried out to determine the survivability of the nematodes under two cycles of freezing and thawing. The alginate balls were frozen for two weeks and thawed to verify survivability of the nematodes, then frozen again for two weeks and thawed to verify survivability of the nematodes. The nematode survivability did not change after two cycles of freezing and thawing.

Heating of the alginate balls: The control and heated samples showed no differences for a testing period of 48 hours.

Alginate balls stored at room temperature: The purpose of the control sample was also to determine if the alginate balls would promote the growth of mold. After several months, it was determined that the alginate balls did not promote the growth of mold or other microbial organisms.

Alginate ball insecticidal infectivity: This test determined the insecticidal infectivity of the alginate balls in soil. After 48 hours in the incubator, all 32 *Galleria mellonella* died.

Conclusion:

The ability to withstand freezing and thawing allows the alginate balls to be stored indoors or outdoors during winter periods. Not promoting the growth of mold and being able to withstand higher temperatures allows the alginate balls to be stored at room temperature. The nematodes' ability to exit the alginate balls and inoculate all *Galleria mellonella* specimens demonstrates the alginate balls' infectivity.

Example 5: Infectivity of Nematodes Stored in Alginate Balls

Infectivity of nematodes stored in alginate balls at room temperature was observed. The alginate balls were made according to the methods as described in Example 3, however the alginate balls were not coated with cellulose. After a ten month storage period at room temperature, the *Steinernema feltiae* nematodes stored in alginate balls had 100% infectivity against *Galleria mellonella*.

TABLE 2

Infectivity of nematodes stored in alginate balls

| Nematode Strain | Number of months stored in alginate balls | Number of live Galleria mellonella larvae contacted with alginate balls | Number of Galleria mellonella larvae infected |
|---|---|---|---|
| *Steinernema feltiae* | 3 | 7 | 7 |
| *Steinernema feltiae* | 6 | 7 | 7 |
| *Steinernema feltiae* | 10 | 7 | 7 |

Example 6: Alginate Ball Formulation (Pot Popper™) Soil Tests Phase Two Field Testing Abstract:

The purpose of this experiment was to highlight and determine the infectivity and survivability of the alginate balls (granules), the product in Pot Popper™ Organic Insect Control. The entomopathogenic nematode, *Steinernema carpocapsae*, and *Heterorhabditis bacteriophora*, reduce larval populations of white Grubs in soil. Efficacy of entomopathogenic nematodes, however, may be affected by freezing and thawing of soil placed in retail bags that are sold in retail along with commercial. This field experiment measured the nematodes' viability of freezing and thawing of the Pot Popper™ alginate balls in soil in a field test. Field experiments were conducted using only fresh Pot Popper™ balls (composition #8 detailed herein for tests 1 and 3 below and composition #9 detailed herein for test 2 below) and fresh potting soil supplied by Premier Tech Horticulture under the Hillsview brand.

This was achieved by conducting a series of tests, the first test determined if the nematodes could survive in the alginate balls in frozen soil by placing bags filled with soil in different locations that were affected by weather. The bags were opened and 14.4 grams of alginate balls were placed and mixed into the soil of each bag and taped closed. The bags were placed in different locations, one in a shed with no heat; two bags were placed outside on the ground: one bag placed on top of the other bag, as if it were stored outside in a garden centre, greenhouse, or unheated warehouse for the winter months; one bag was placed on cement as if it were stored in a parking lot or outside at a garden centre; and one bag was placed in a garage away from outside weather under warmer conditions.

The second test determined if the nematodes could survive in the alginate balls in 27 degrees Celsius soil by putting effected *Galleria* into small petri dishes into an incubator. As a control, 2 small petri dishes with soil and alginate balls were left in room temperature.

The third and final test determined the infectivity of the alginate balls in soil. This was accomplished by placing 10 *Galleria mellonella* (Wax worms) into 300 grams of soil taken from each bag and allowed to set in a dark location at 22 degrees Celsius for three days to see if the *Galleria* were infected.

Materials and Method:

First Test: Potting Soil Bag with Alginate Nematodes Mixed Inside
- Soil used was HILLVIEW POTTING SOIL by Premier Tech Horticulture
- Soil was placed into 4 different locations
  - Inside a shed with no heat
  - On the ground outside with mix of sun and shade
  - On cement ground outside in full sun
  - Inside an unheated garage without exposure to exterior weather conditions.
- Each bag of soil had 14.4 grams of alginate balls (of alginate nematodes mixed inside *Steinernema feltiae*, filled alginate balls)
- The bags of 52 L of soil were taped closed and the weather conditions were observed for 6 months.

Second Test: Room Temperature Alginate Balls
- Soil was put into 2 small petri dishes with 10 *Galleria mellonella*
- Each petri dish contained zero to 7 balls *Steinernema carpocapsae* and *Heterorhabditis bacteriophora* filled alginate balls
- The dishes were sealed with Parafilm and left in room temperature Third/Final Test: Alginate Ball Infectivity
- Each bag from Test #1 was opened and 300 grams removed and placed into large ziploc bag and 10 *Galleria mellonella* were added.
- Two samples of each bag were taken and the ziploc bags containing soil and 10 *Galleria* were placed into a dark place at a room temp of 22 degrees Celsius, and left for 3 days.
- After 3 days, the samples were checked to see if any of the *Galleria* was infected with nematodes.
- The infected *galleria* were counted and removed from the soil samples.
- The soil was lightly moistened to allow nematode movement.
- The soil and nematodes were placed into petri dish along with the *galleria*, sealed with Parafilm and put into an incubator at 27 degrees Celsius.

Results:

Throughout the six months, the soil bags were examined for hardness and also if ice or snow had accumulated on the bags in the outside environment. The one bag located in the shed was hard to the touch just like the soil bags left on the ground in the environment. All the bags were hard at the end of December from the exposure to cold temperatures. The only bag that was never frozen was the one bag that was placed in the garage away from the external weather conditions.

In past experiments and testing of the alginate balls with nematodes, it was observed that the nematodes surrounding the outer shell of the alginate ball died, due to the direct cold temperature. Although, the nematodes that were inside the cellulose shell and those deep within the alginate ball were not affected by the freezing temperature.

The incubated sample aged faster than the control since it was at a higher temperature; this method is called accelerated aging and represents 6 months of storage at room temperature. In theory, the incubated sample should predict the expiration date but due to the product being alive after the test was complete it proves that the Alginate balls survive thawing out as temperatures warm up.

The final test determined the infectivity of the alginate balls in soil. After the six month time frame the *Galleria* were placed into the soil to see if the nematodes could affect the *Galleria*. Results showed that they were infected, and in fact they turned grey and died. FIGS. 5A to 5F provide a representation of the wax worms.

Table 3. Illustrates the temperatures the Pot Popper alginate balls (granules) were exposed to during the 6 month period of the experiment. This chart from Canada Climate shows the mean Minimum temperature the test material was exposed to from November 2015 until April 2016.

TABLE 3

The weather condition for the six month as per Government of Canada climate data below:

Government of Canada Climate
Daily Data Report for October 2015
"Oshawa Ontario"
Latitude:       43 55'22.000 N  Longitude: 78 53'00.041 W   Elevation   139.90 M

| Number of days | Max temp | Min temp | Mean | Total Rain | Total Precip |
|---|---|---|---|---|---|
| 31 | 21.1 | −4.7 | | | 113 |
| Avg. | 13.6 | 3.5 | 8.6 | | |
| Daily Data Report for November 2015 | | | | | |
| 30 | 19.2 | −8.5 | | | 21.9 |
| Avg. | 10.4 | −0.4 | 5 | | |
| Daily Data Report for December 2015 | | | | | |
| 31 | 14.9 | −7.4 | | | 34.8 |
| Avg. | 6.8 | −0.3 | 3.3 | | |
| Daily Data Report for January 2016 | | | | | |
| 31 | 8.9 | −17.9 | | | 43.6 |
| Avg. | −0.1 | −8.6 | −4.4 | | |
| Daily Data Report for February 2016 | | | | | |
| 29 | 12.1 | −27.1 | | | 36.7 |
| Avg. | 1.2 | −8.2 | −3.5 | | |
| Daily Data Report for March 2016 | | | | | |
| 31 | 15.4 | −16.6 | | | 76 |
| Avg. | 5.7 | −4 | 0.9 | | |
| Daily Data Report for April 2016 | | | | | |
| 7 | 10.3 | −10 | | | 9.9 |
| Avg. | 3.4 | −4.9 | −0.7 | | |

Figure 2A:
Figure 2B:
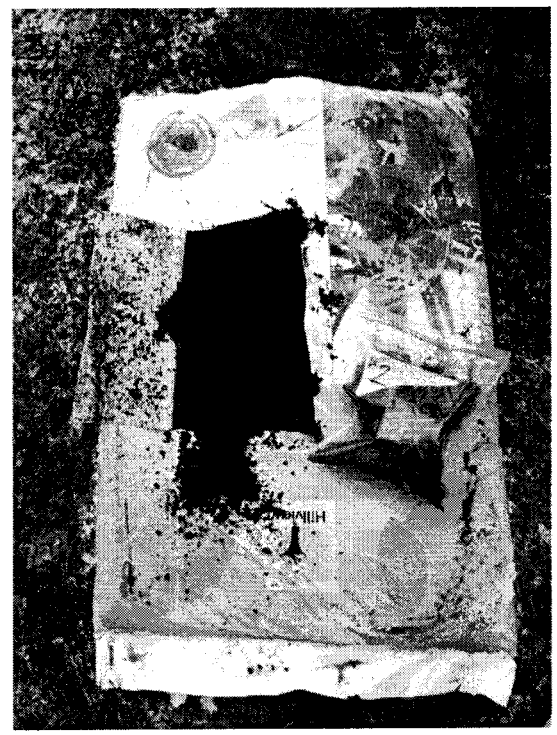
Figure 2C:
Figure 2D:
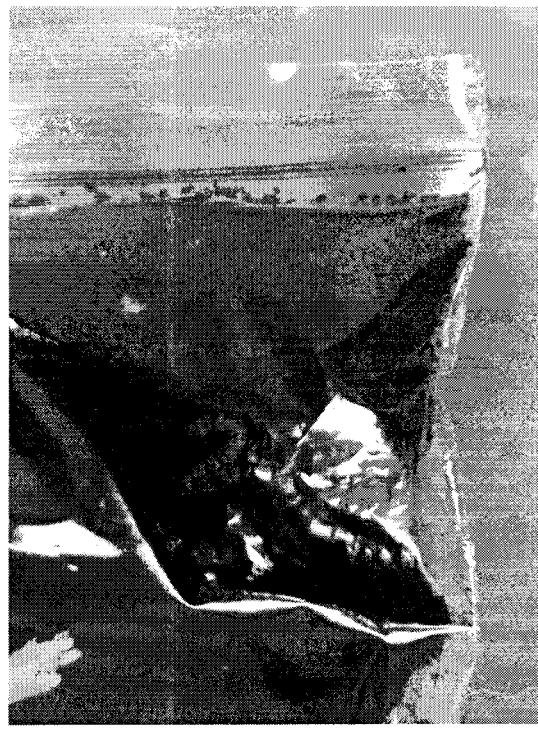

FIG. 2A shows a soil bag supplied by a customer. 300 grams of soil were placed in each of five bags and two samples were taken for each bag of soil (FIG. 2B). 10 *Galleria* were placed into each soil sample bag (FIG. 2C). All the soil sample bags were placed into a dark area to let the nematodes find the *Galleria*. After 3 days of the soil sample being placed in the dark location, the soil samples showed that the *Galleria* were infected by the nematodes (FIG. 2B and Table 4).

TABLE 4

Infected galleria counts from 10 Soil Samples retrieved from 5 Potting Soil bags:
*Galleria* counts per bag of 300 grams of soil

| Sample # | ALIVE | INFECTED |
|---|---|---|
| Bag #1 a | 3 | 5 |
| Bag #1 b | 4 | 5 |
| Bag #2 a | 1 | 6 |
| Bag #2 b | 4 | 7 |
| Bag #3 a | 8 | 2 |
| Bag #3 b | 5 | 2 |
| Bag #4 a | 5 | 4 |
| Bag #4b | 6 | 4 |
| Bag #5 a | 2 | 8 |
| Bag #5 b | 2 | 8 |

Figure 3:
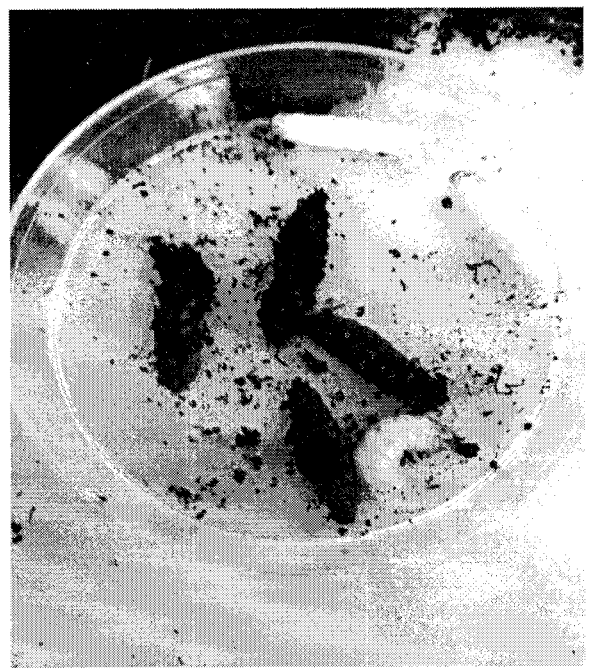
FIG. 3 shows infected *Galleria* counts in extracted Alginate Granules from potting soil blend.

Results:

In Test #3 infected larvae were found in all bags of soil samples (FIG. 3).

Bag #1 was placed in an outside shed with no heat but no direct contact with weather.

Bag #2 was placed outside on the ground (bottom) and on top was placed bag #3. Positive results were achieved from the Bag #2 even though it had compression from the weight of Bag #3.

Bag #3 on the top had lower counts of infected *galleria* than Bag #2 showing that compression had no impact on efficacy of the Alginate balls.

Bag #4 was placed by itself inside the unheated garage with no compression, and had moderate infection, but less than Bag #1 or #2 with outside exposure.

Bag #5 was placed in an unheated garage away from the outdoor elements but was also warmer than the shed due to the heat from the home. #5 also had good results.

Figure 4:
FIG. 4 shows Petri dishes with infected *Galleria*.

Plate infected *galleria* from Test #2 (FIG. 4): After 3 days, the plate had so much white mold it was impossible to have the *galleria* release any nematodes.

Test #3: Nematodes were found in the soil. See FIGS. 5A to 5F.

Test #3 Nematodes of all different stages were found in soil samples taken from all bags (#1-#5). The highest count was found in Bag #5 in the unheated garage. Also the *Galleria* from that bag had the most infected amount.

FIGS. 5A to 5F confirm that the nematodes were able to breach the alginate barrier and successfully live through the entire Canadian winter.

Further long-term testing is continuing.

Conclusion:

The freezing and thawing of Alginate balls had no effect on the survival of the nematodes. Therefore, it is expected that this product can be placed into soil in bags and go through high and low temperatures and the nematodes will still effectively kill larvae in soil. Once the nematodes are in soil, this soil can be used in landscaping to repair grub damage and also be used to place the nematodes into soil. This soil can be used as a potting soil that can stop insects from infecting the soil. This soil can be used in gardening to control insects. Also having the nematodes in the soil before selling the product can stop insects from being shipped in soil and also kill unwanted larvae in the bag of soil.

The calculation that can be used for each a litre of soil:

1 alginate ball contains approximately 2000 nematodes in 20 ml of soil. 10 alginate balls in 1 L of soil contains approximately 20,000 nematodes per ball of Sc/Hb nematodes or Sf.

52 L of soil in a bag would need 520 balls per bag, which is approximately 14.4 grams of 1,400,000 nematodes to be effective.

Extra benefits: The alginate balls are food grade and slowly biodegrade slowly releasing the nematodes into the soil.

With all soil, insect larvae can be found. Thus, the nematodes will have a food source to breed and keep growing over one season. This also means that the soil will have less unwanted insects in the retail bag. This same process can be done with different nematodes for different soil mixtures for example potting soil for fungus gnat, cut worm and other insect larva.

Examples Relating to Cellulose-Based Formulations

Example 7: Viability of Nematodes in Gel Formulations

The purpose of the experiment was to investigate suitable gel formulations for entomopathogenic nematodes. The gel formulation should be able to provide the necessary moisture and limited oxygen supply. The formulation would not contain nutrients for the nematodes, which should make the formulation more stable and less prone to microbial contamination. The gel formulation should also limit the movement of the nematodes—which results in saving their energy reserve. The two cruiser-type nematode species used in this experiment were *Steinernema glaseri* and *Heterorhabditis bacteriophora.*

Many different gels were tested during the experiment. The first gel tested was gelatin. Gelatin was thought to be a good gel due to its ability to hold its form. However, it was prone to contamination and not sufficiently water soluble. Pectin, similar to gelatin but made from the fibers of fruit peels, was tested and it was found that although it was more water soluble than gelatin, it did not form into a gel fast enough and was also prone to contamination. The next gel tested was glycerin, due to its presence in cosmetic products and its water solubility. It was found that above a concentration of 13%, all the nematodes die. The following gel tested was cellulose, a water soluble gel that is non-toxic for the nematodes.

Method:

The infectile juveniles (IJs) of entomopathogenic nematodes were produced in vivo using *Galleria mellonella* larvae and the White trap nematode production procedure (White G F. Et al. 1927). The Us were then washed with distilled water, introduced and mixed gently in the previously prepared cellulose-based water gel n clean glass vials in duplicates. The resulting nematode-gel formulation had a concentration of 16% w/v nematodes, 3% w/v carboxymethyl cellulose and 81% w/v deionized water. The gel glass vials were marked with a date and nematode species present in the formulation and placed in the incubator at 27° C. or at room temperature with 8-hour light exposure.

The cellulose gel samples containing the nematodes were occasionally examined by carefully taking a small gel formulation sample from the vials with a sterilized metal spatula and observing them under the microscope (at 40× and 100× magnifications).

The nematodes were tested for entomopathogenic efficacy after 20, 60 and 90 days. The small sample of the nematode gel was taken from the sample vials and placed on the 55 mm wide filter paper in the 60 mm Petri plate. The filter papers were wetted with distilled water (until the surface of the paper was shiny but not excessively wet). Five clean healthy *galleria* larvae were introduced into each plate and the plates were closed. After 48 hours the plates were examined for the nematodes efficacy.

Results:

The nematode formulation gel samples were observed for injective juveniles (IJ) viability, contamination by microorganisms, and turbidity. The results are presented in Tables 5, 6 and 8.

TABLE 5

IJs viability, microbial contamination, and turbidity-20 days

| Time (Days) | Sample (Nematode Species) | Live Nematode Percentage (%) | Microorganism Contamination | Turbidity |
|---|---|---|---|---|
| 20 | *H. bacteriophora* Room t° Sample 1 | >90% | Not Present | Clear |
| 20 | *H. bacteriophora* Room t° Sample 2 | >90% | Not Present | Clear |
| 20 | *H. bacteriophora* 27° C. Sample 1 | >90% | Not Present | Clear |
| 20 | *H. bacteriophora* 27° C. Sample 2 | <10% Sample Discarded | Present | Slightly Turbid |
| 20 | *S. glaseri* Room t° Sample 1 | <50% | Present | Clear |
| 20 | *S. glaseri* Room t° Sample 2 | >90% | Not Present | Clear |
| 20 | *S. glaseri* 27° C. Sample 1 | >90% | Not Present | Clear |
| 20 | *S. glaseri* 27° C. Sample 2 | <10% Sample Discarded | Present | Slightly Turbid |

The contamination of the sample was caused mainly by aquatic protozoa (visible under 40× and 100× magnifications), which indicates that the contamination source was water used in gel preparation or water used in nematode production.

TABLE 6

IJs viability, microbial contamination, and turbidity-60 days

| Time (Days) | Sample (Nematode Species) | Live Nematode Percentage (%) | Microorganism Contamination | Turbidity |
|---|---|---|---|---|
| 60 | *H. bacteriophora* Room t° Sample 1 | >80% | Not Present | Clear |
| 60 | *H. bacteriophora* Room t° Sample 2 | >80% | Not Present | Clear |
| 60 | *H. bacteriophora* 27° C. Sample 1 | >60% | Not Present | Clear |
| 60 | *S. glaseri* Room t° Sample 1 | <10% Sample Discarded | Present | Slightly Turbid |
| 60 | *S. glaseri* Room t° Sample 2 | >60% | Not Present | Clear |
| 60 | *S. glaseri* 27° C. Sample 1 | <20% Sample Discarded | Not Present | Clear |

After 60 days the nematodes were tested for their entomopathogenic efficacy. For that purpose one *S. glaseri* and one *H. bacteriophora* sample were used for the infectivity test on *Galleria mellonella* larvae. The results are presented in Table 7.

TABLE 7

Nematode entomopathogenic efficacy-60 days

| Time (Days) | Sample (Nematode Species) | *Galleria* Larvae Number Per Plate/Infected *Galleria* Number Larvae | Nematode Entomopathogenic Efficacy (%) |
| --- | --- | --- | --- |
| 60 | *S. glaseri* | 5/5 | 100 |
| 60 | *H. bacteriophora* | 5/5 | 100 |

TABLE 8

IJs viability, microbial contamination, and turbidity-90 days

| Time (Days) | Sample (Nematode Species) | Live Nematode Percentage (%) | Microorganism Contamination | Turbidity |
| --- | --- | --- | --- | --- |
| 90 | *H. bacteriophora* Room t° Sample 1 | >75% | Not Present | Clear |
| 90 | *H. bacteriophora* Room t° Sample 2 | >75% | Not Present | Clear |
| 90 | *H. bacteriophora* 27° C. Sample 1 | <10% | Not Present | Clear |
| 90 | *S. glaseri* Room t° Sample 2 | <10% | Not Present | Clear |

Conclusion:

The cellulose-based gel can be used as a formulation for entomopathogenic nematodes for their storage at room temperature. From the presented results, the *H. bacteriophora* IJs can be stored in the cellulose-based gel up to 90 days at room temperature, while *S. glaseri* can be stored for 60 days. Furthermore, the stored nematodes still maintain their infectiveness—entomopathogenic efficacy.

However, the potential contamination of the formulation is the main problem in achieving the longer nematode viability. The microorganisms in formulation compete with nematodes for oxygen; also their metabolism byproduct can have adverse effects on stored nematodes.

The viability of the nematodes can be improved by using clean, sterilized ingredients (like sterilized water) and better cleaning nematode procedure. The adjustment of the pH of the formulation can also have positive effects on the nematode survival rate, especially because the nematodes have solid resistance to lower and higher pH values.

The inorganic salt mixture addition with ascorbic acid is known for improving the nematode survival: NaCl (sodium chloride) 11.25 g/L, KCl (potassium chloride) 0.525 g/L and $MgSO_4 \times 7H_2O$ (magnesium sulfate heptahydrate) 0.315 g/L and it could be added to the formulation.

Example 8: Gel Compositions

Different gel compositions were tested to determine optimal gel composition for prolonged storage of cruiser-type nematodes (*Steinernema glaseri* and *Heterorhabditis bacteriophora*)

The different compositions that were tested are the following:

Composition 1:
  25 million cruiser-type nematode (16% w/v)
  200 mL of deionized water (80% w/v)
  2% sodium polyacrylate (2.5% w/v)
  0.5% Ethyl hydroxyethyl cellulose (1.5% w/v)
  Vermiculite coating Composition 2:
  25 million cruiser-type nematode per unit (16% w/v)
  200 mL of deionized water (80% w/v)
  2.5% sodium polyacrylate (2.5% w/v)
  1.5% carboxymethyl cellulose (1.5% w/v)
  Vermiculite coating Composition 3:
  25 million cruiser-type nematode per unit (16% w/v)
  200 mL of deionized water (80% w/v)
  2.5% sodium alginate (2.5% w/v)
  1.5% Ethylcellulose (1.5% w/v)
  Vermiculite coating Composition 4:
  25 million cruiser-type nematode per unit (16% w/v)
  200 mL of deionized water (81% w/v)
  3% cellulose propionate (3% w/v)
  Vermiculite coating Composition 5:
  Ingredients:
  25 million cruiser-type nematode per unit (16% w/v)
  200 mL of deionized water (80.2% w/v)
  sodium alginate (3% w/v)
  calcium chloride (0.8% w/v)
  cellulose acetate coating Final Formulation:
  25 million cruiser-type nematode per unit (16% w/v)
  200 mL of deionized water (81% w/v)
  calcium alginate (3% w/v)
  cellulose acetate coating Composition 6:
  25 million cruiser-type nematode per unit (16% w/v)
  200 mL of deionized water (80% w/v)
  5 g of Gelatin (3% w/v)
  1% nitrocellulose (1% w/v)

Composition 7:
  25 million cruiser-type nematode per unit (16% w/v)
  200 Ml of deionized water (80% w/v)
  5 g of pectin (3% w/v)
  1% cellulose acetate propionate (1% w/v)

Composition 8:
  Ingredients:
  30 million ambusher-type nematode per unit (3% w/v)
  1000 mL of deionized water (93% w/v)
  sodium alginate (2.95% w/v)
  calcium chloride (0.5% w/v)
  Carboxymethyl cellulose coating (0.05)

Composition 9:
  Ingredients:
  30 million cruiser-type nematode per unit (3% w/v)
  1000 mL of deionized water (93% w/v)
  sodium alginate (2.95% w/v)
  calcium chloride (0.5% w/v)
  Carboxymethyl cellulose coating (0.05)

As shown in Table 9, the survivability of the nematodes according to the type of compositions was assessed after 7 days, 1 month, 2 months and 6 months at room temperature. The nematodes comprised in compositions 2 and 5 survived after 6 months. In both compositions, the nematodes had limited or no movement due to the density of the cellulose gel or the alginate gel, allowing them to enter a dormant state, therefore preserving their energy and allowing them to survive for longer periods of time. Compositions 1, 3, 4, 6, 7 did not provide sufficient density in the gels and therefore did not sufficiently limit the movement of the nematodes which did not survive more than one month. Further, composition 6 comprising gelatin was not effective as the gelatin did not dissolve sufficiently. Finally, composition 7 comprising pectin caused mold to grow.

TABLE 9

Survivability of nematodes according to compositions

| Composition | Results after 7 days | Results after 1 month | Results after 2 months | Results after 6 months |
|---|---|---|---|---|
| 1 | The ethyl hydroxyethyl cellulose did not gel enough to suspend the nematodes. | Non-suspended, nematodes died due to usage of energy and no nutrients. | N/A | N/A |
| 2 | Stable, suspended nematodes in hibernation mode | Stable, suspended nematodes in hibernation mode | Stable, suspended nematodes in hibernation mode | Stable, suspended nematodes in hibernation mode |
| 3 | The ethylcellulose did not gel enough to suspend the nematodes. | Non-suspended, nematodes died due to usage of energy and no nutrients. | N/A | N/A |
| 4 | The cellulose propionate did not gel enough to suspend the nematodes. | Non-suspended, nematodes died due to usage of energy and no nutrients. | N/A | N/A |
| 5 | Hard, firm alginate gel. Nematodes cannot move. | Gel is still firm and 0 loss of moisture. | Gel is still firm and 0 loss of moisture. | Gel is still firm and 0 loss of moisture. |
| 6 | The nitrocellulose did not gel enough to suspend the nematodes. Gelatin would not dissolve. | Non-suspended, nematodes died due to usage of energy and no nutrients. | N/A | N/A |
| 7 | The cellulose acetate propionate did not gel enough to suspend the nematodes. The pectin caused mold to grow. | Non-suspended, nematodes died due to usage of energy and no nutrients. | N/A | N/A |

Example 9: Improved Cellulose-Based Formulation

An improved cellulose-based nematode formulation was developed comprising a carboxymethyl cellulose and sodium polyacrylate.

Materials:
    2.5 g sodium polyacrylate (2.5% w/v)
    1.5 g carboxymethyl cellulose (1.5% w/v)
    100 mL deionized water (80% w/v)
    12.5 million cruiser-type nematodes (16% w/v)
    Vermiculate for coating Method:
    100 mL of deionized water was poured into a 200 mL beaker;
    12.5 million nematodes were added to the 200 mL beaker;
    2.5 g of sodium polyacrylate was evenly poured in the 200 mL beaker;
    The beaker contents were stirred to keep the nematodes suspended, allowing the nematodes to settle would cause the concentration to be uneven;
    1.5 g of carboxymethyl cellulose was poured overtop the nematode/gel solution and mixed into the gel thoroughly;
    Once the contents of the beaker turned completely into a gel, the gel was divided into 4 quadrants;
    A piece of the gel quadrant was rolled it in the vermiculite tray, making sure to heavily powder the gel since a lot of vermiculite was absorbed by some of the gel moisture;
    This step was repeated the remaining 3 pieces of gel; and
    The coated gel pieces were run through the t-bag machine for packaging.

Example 10: Infectivity of Nematodes Stored in Cellulose-Based Formulations

Infectivity of nematodes stored in a cellulose-based formulation as described in Example 8 was observed. As shown in Table 10, after a three month and a six month storage period at room temperature, the *Steinernema feltiae* nematodes stored in cellulose based formulation had 100% infectivity against *Galleria mellonella*.

TABLE 10

Infectivity of nematodes stored in cellulose-based formulations

| Nematode strain | Number of months stored in cellulose-based formulation | Number of live *Galleria mellonella* larvae contacted with the cellulose-based formulation | Number of *Galleria mellonella* larvae infected |
|---|---|---|---|
| *Steinernema glaseri* | 3 | 7 | 7 |
| *Heterorhabditis bacteriophora* | 3 | 7 | 7 |
| *Steinernema glaseri* | 6 | 7 | 7 |
| *Heterorhabditis bacteriophora* | 6 | 7 | 7 |

While the present application has been described with reference to what are presently considered to be the preferred examples, it is to be understood that the application is not limited to the disclosed examples. To the contrary, the application is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety.

CITATIONS FOR REFERENCES REFERRED TO IN THE SPECIFICATION

1. Grewal P S et al. Nematodes as Biocontrol Agents. CABI, New York, N.Y. 2005
2. Grewal et al. Host finding behavior as a predictor of foraging strategy in entomopathogenic nematodes. Parasitology 108:207-215, 1994.
3. Umamaheswari et al. Survival and infectivity of entomopathogenic nematodes in alginate gel formulations against rice meal moth larva, *Corcyra cephalonica* Stainton. Natural Product Radiance 5(2):95-98, 2006.
4. White G F. A method for obtaining infective nematode larvae from cultures. Science 66:302-303, 1927.

The invention claimed is:

1. A nematode formulation comprising about 2.0% w/v to about 30.0% w/v infective juveniles of entomopathogenic nematodes and a water content less than 80.0% w/v; wherein the nematode formulation is obtained by a method comprising:
- a. mixing infective juveniles of entomopathogenic nematodes with an alginate solution to form an alginate gel;
- b. encapsulating the alginate gel by contacting said alginate gel with a complexing solution comprising a complexing agent and water;
- c. removing the alginate capsules from the complexing solution;
- d. rinsing the alginate capsules in water to remove remaining complexing solution;
- e. drying the alginate capsules for at least 3 hours;
- f. coating the alginate capsules with a cellulose compound, wherein the cellulose compound is cellulose acetate, carboxylmethyl cellulose, ethyl methyl cellulose, hydroxypropyl cellulose or methylcellulose; and
- g. drying the alginate capsules, wherein the infective juveniles of entomopathogenic nematodes are in suspension in the final formulation.

2. The nematode formulation of claim 1, wherein the infective juveniles of entomopathogenic nematodes belong to a *Steinernema* species or a *Heterorhabditiss* species.

3. The nematode formulation of claim 1, wherein the alginate solution comprises about 1.0% w/v to about 5.0% w/v sodium alginate and about 95.0% w/v to about 99.0% w/v water or about 3.0% w/v sodium alginate and about 97.0% w/v water.

4. The nematode formulation of claim 1, wherein the complexing agent is calcium chloride and wherein the complexing solution comprises about 0.5% w/v to about 1.5% w/v calcium chloride, optionally about 0.8% w/v calcium chloride.

5. The nematode formulation of claim 1, wherein the cellulose compound is carboxymethyl cellulose.

6. The nematode formulation of claim 1, wherein the alginate capsules are dried for at least 4, at least 5, at least 6, at least 7, at least 9, at least 10 or at least 15 hours prior to coating of said alginate capsules with the cellulose compound.

7. The nematode formulation of claim 1, wherein the alginate capsules remain in the complexing solution for about 30 minutes.

8. The nematode formulation of claim 1, wherein the cellulose-coated alginate capsules are dried for about 1 to about 5 days.

9. The nematode formulation of claim 1, wherein the formulation comprises about 20.0% w/v to about 30.0% w/v infective juveniles of entomopathogenic nematodes.

10. The nematode formulation of claim 1, wherein the formulation is capable of being stored at a temperature ranging from about −10° C. to about 30° C.

11. The nematode formulation of claim 1, wherein the formulation is capable of being stored for at least a six month period or at least a ten month period and/or under aerobic conditions.

12. The nematode formulation of claim 1, wherein the method to obtain the nematode formulation further comprises continuously stirring the infective juveniles of entomopathogenic nematodes with the alginate solution until formation of the alginate gel to ensure suspension of the infective juveniles of entomopathogenic nematodes.

* * * * *